United States Patent [19]
Kuroda

[11] Patent Number: 5,499,107
[45] Date of Patent: Mar. 12, 1996

[54] LASER BEAM OPTICAL SCANNING SYSTEM

[75] Inventor: Muneo Kuroda, Toyohashi, Japan

[73] Assignee: Minolta Co., Ltd., Osaka, Japan

[21] Appl. No.: 875,688

[22] Filed: Apr. 29, 1992

[30] Foreign Application Priority Data

Apr. 30, 1991 [JP] Japan ..................... 3-097816
Dec. 13, 1991 [JP] Japan ..................... 3-330949

[51] Int. Cl.⁶ ..................... H04N 5/84
[52] U.S. Cl. ..................... 358/347; 358/348; 358/480
[58] Field of Search ..................... 358/480, 502, 358/505, 348, 347, 335, 481; 359/820, 675; 369/121; H04N 5/84

[56] References Cited

U.S. PATENT DOCUMENTS

| | | | |
|---|---|---|---|
| 4,297,713 | 10/1981 | Ichikawa et al. | 346/108 |
| 4,861,137 | 8/1989 | Nagata | 359/820 |
| 4,978,976 | 12/1990 | Okino | 358/505 |
| 4,983,026 | 1/1991 | Kudo et al. | 359/675 |
| 5,225,928 | 7/1993 | Dugan | 359/820 |
| 5,233,455 | 8/1993 | Yamaguchi et al. | 359/820 |

*Primary Examiner*—Howard W. Britton
*Assistant Examiner*—Huy Nguyen
*Attorney, Agent, or Firm*—Price, Gess & Ubell

[57] ABSTRACT

A laser beam optical scanning system which has a laser source unit for emitting a laser beam which is a parallel pencil of rays, a first imaging system for imaging the laser beam emitted from the laser source unit on a reflective facet of a deflector, and a second imaging system for imaging the laser beam deflected by the deflector on a photosensitive drum. At least one of the first and the second imaging systems has a resin lens. The resin lens changes its power according to temperature so as to offset a change in light converging performance of the laser source unit.

25 Claims, 13 Drawing Sheets

SUB-SCANNING DIRECTION

MAIN-SCANNING DIRECTION

LASER BEAM OPTICAL SCANNING SYSTEM

BACKGROUND OF THE INVENTION

1. Field of the Invention

The present invention relates to a laser beam optical scanning system, and more particularly to a laser beam optical scanning system used as a write head of an image forming apparatus such as an electrophotographic copying machine, a laser printer or a facsimile.

2. Description of Related Art

Conventionally, in an electrophotographic laser printer, a laser beam optical scanning system for writing an image on a photosensitive drum has been using a laser diode as a light source. A laser beam emitted from the laser diode is deflected on a plane at a constant angular velocity by a deflector (polygonal mirror), and an optical element such as an fθ lens or an fθ mirror adjusts scanning speed. Then, the laser beam is imaged on a scanning surface (photo-sensitive drum). The laser beam emitted from the laser diode is a light diffused within a certain angle. In order to change the diffused light into a substantially parallel pencil of rays, a convergent lens (collimator lens) is disposed in front of the laser diode. Further, the parallel pencil of rays is imaged on a reflective facet in a linear form extending in the plane of deflection.

Recently, there is a trend of using resin instead of glass as a material of optical elements for the purposes of facilitating the manufacture and reducing the cost. However, a resin optical element (lens) changes its shape (thickness and radius of curvature) and refractive index according to temperature, thereby causing defocus and changing the size of a beam spot on the scanning surface.

Additionally, a light source unit comprising the laser diode, the convergent lens and a holder thereof changes its shape, thereby changing the convergence of the laser beam, according to temperature. The change is enlarged while the beam is passing through downstream optical elements, thereby causing defocus.

SUMMARY OF THE INVENTION

An object of the present invention is to provide a laser beam optical scanning system wherein defocus with a change in temperature can be inhibited to such a low degree as not to cause practical problems. In the present invention, the object is intended to be achieved by offsetting a change in the light converging performance of a light source unit by a change in the light converging performance of an imaging unit having a resin optical element.

According to the present invention, a laser beam optical scanning system which deflects a laser beam modulated in accordance with image data by using a deflector to scan the laser beam on a scanning surface comprises: a laser source unit which converges a laser beam to emit a substantially parallel pencil of rays; first imaging means for imaging the laser beam emitted from the laser source unit on a reflective facet of the deflector in a linear form extending in a plane of deflection to be made by the deflector; second imaging means for imaging the laser beam deflected by the deflector on the scanning surface; and a resin lens which is provided in the first and/or the second imaging means. The laser source unit changes its converging performance according to temperature. The resin lens changes its power according to temperature so as to offset a change in the converging performance of the laser source unit.

In this way, a change in the converging performance of the laser source unit with a change in temperature is offset by a change in the power of the resin lens, and consequently, the imaging of the laser beam on the scanning surface hardly changes.

Further, the laser source unit comprises: a laser source for radiating a laser beam; a holder for holding the laser source; and a convergent member for changing the laser beam radiated from the laser source into a substantially parallel pencil of rays. With a rise in temperature, the holder laid between the laser source and the converging member expands, and the distance between the laser source and the converging member increases. Accordingly, the laser beam emergent from the converging member is more strongly converged. As a result, the laser beam images on a point before the scanning surface, that is, negative defocus occurs. Meanwhile, the resin lens deforms with a rise in temperature, thereby causing positive defocus. The negative defocus and the positive defocus are offset by each other, that is, the image point substantially stays on the scanning surface. Thus, defocus can be inhibited to a low degree, and the size of a beam spot on the scanning surface hardly changes.

BRIEF DESCRIPTION OF THE DRAWINGS

This and other objects and features of the present invention will be apparent from the following description with reference to the accompanying drawings, in which.

DETAILED DESCRIPTION OF THE PREFERRED EMBODIMENTS

Some exemplary laser beam optical scanning systems according to the present invention are hereinafter described with reference to the accompanying drawings. In the embodiments below, same parts and members are denoted by the same numbers and marks.

First Embodiment: See FIGS. 1–6

Figure 1:
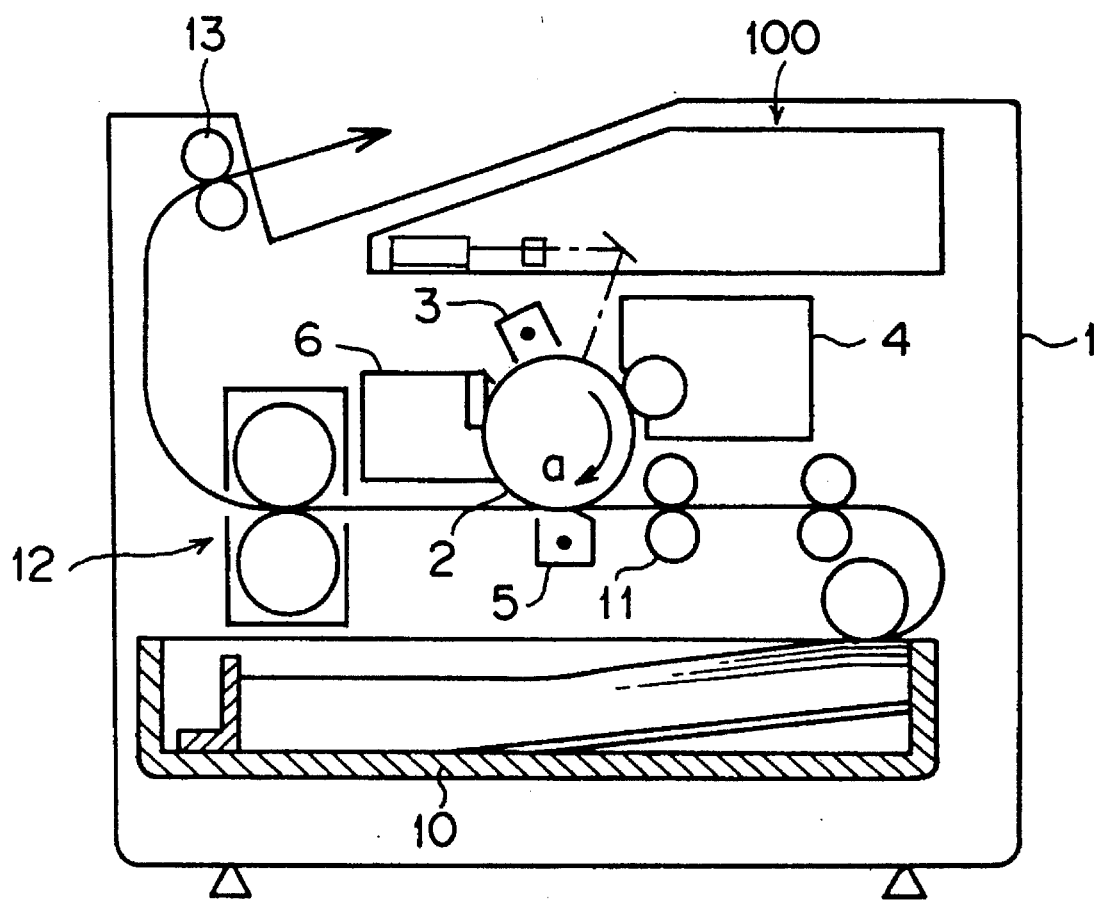
FIG. 1 is a schematic view of a printer employing a laser beam optical scanning system according to the present invention.

FIG. 1 shows a laser printer employing a laser beam optical scanning system 100 which is a first embodiment of the present invention.

A photosensitive drum 2 is disposed substantially in the center of a laser printer body 1 and is rotatable in a direction indicated by arrow a. Around the photosensitive drum 2 are an electric charger 3, a developing device 4, a transfer charger 5 and a residual toner cleaner 6. The laser beam optical scanning system 100 is disposed above the photosensitive drum 2. A laser beam emitted from the optical scanning system 100 irradiates a surface of the photosensitive drum 2, which is electrically charged by the electric charger 3 so as to have a specified potential uniformly, and forms a specified electrostatic latent image thereon. The electrostatic latent image is developed into a toner image by the developing device 4.

Meanwhile, recording sheets are automatically fed one by one from a sheet feed cassette 10 disposed in a lower part of the body 1, and each sheet fed from the cassette 10 is transported to a transfer section via timing rollers 11. The sheet receives the toner image in the transfer section, and the toner image is fixed on the sheet by a fixing device 12. Then, the sheet is ejected onto an upper surface of the body 1 through ejection rollers 13.

Figure 2:
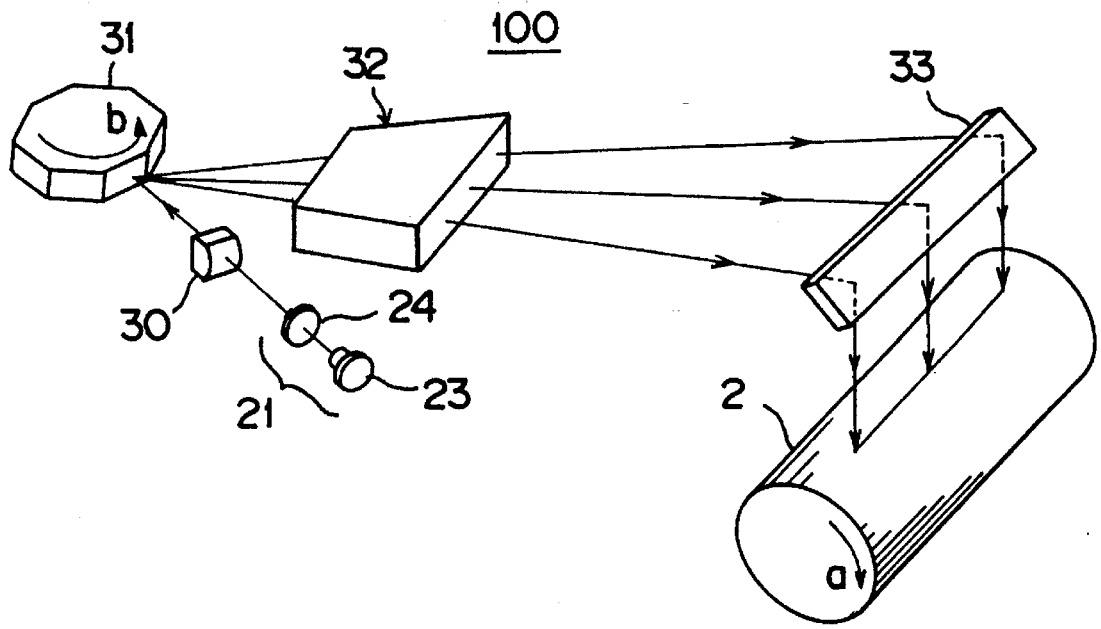
FIG. 2 is a perspective view of a laser beam optical scanning system of a first embodiment.

FIG. 2 shows the laser beam optical scanning system 100.

The optical scanning system 100 comprises a laser source unit 21 mainly composed of a laser diode 23 and a collimator lens 24, a cylindrical lens 30, a polygonal mirror 31, an fθ lens 32 and a plane mirror 33, and these elements are fitted in a housing.

A laser beam (diffused light) radiated from the laser diode 23 is changed into a substantially parallel pencil of rays by the collimator lens 24. The parallel pencil of rays passes through the cylindrical lens 30 to be imaged on a reflective facet of the polygonal mirror 31. The laser beam is imaged on the facet in a linear form extending in a plane of deflection to be made by the polygonal mirror 31. The polygonal mirror 31 is rotated in a direction indicated by arrow b at a constant speed to deflect the laser beam continuously at a constant angular velocity. The deflected laser beam passes through the fθ lens 32 and is reflected by the plane mirror 33. The reflected laser beam proceeds through a slit of the housing and is imaged on the photosensitive drum 2. In this way, the laser beam is scanned in a direction parallel with a rotating axis of the photosensitive drum 2, and scanning in this direction is referred to as main-scanning. Scanning of the laser beam resulting from the rotation of the photosensitive drum 2 is referred to as sub-scanning.

In the above structure, an electrostatic latent image is formed on the photosensitive drum 2 in accordance with modulation of the laser beam radiated from the laser diode 23 and the main-scanning and the sub-scanning. The fθ lens 32 adjusts the scanning speed of the laser beam so that the scanning speed on a main-scanning line will be constant at every portion. In other words, the fθ lens 32 corrects distortion. The cylindrical lens 30 cooperates with the fθ lens 32 so as to correct errors caused by misalignment of the reflective facets of the polygonal mirror 31.

Now, the laser source unit 21 is described.

Figure 3:
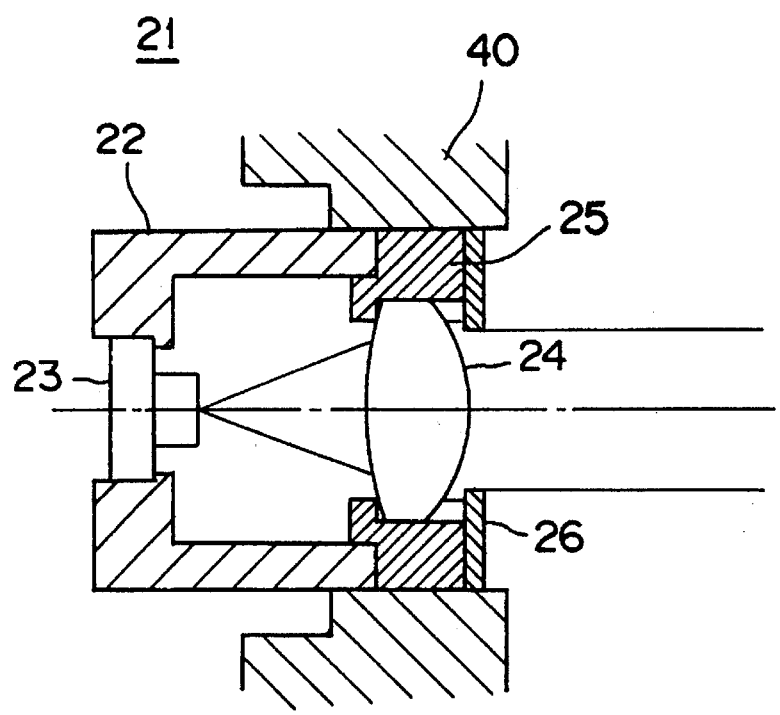
FIG. 3 is a sectional view of a laser source unit.

As shown in FIG. 3, the laser diode 23 is mounted in a holder 22, and a holder 25 holding the collimator lens 24 is disposed in front of the holder 22 and fastened thereto. The holder 25 is further secured to a wall 40 of the housing. Plates 26 are fastened to the holder 25 so as to settle the form of the laser beam. The laser diode 23 emits a diffused light when it is supplied with a specified amount of electric current. The diffused light is changed into substantially a parallel pencil of rays by the collimator lens 24, and the parallel pencil of rays proceeds toward the cylindrical lens 30.

Next, how a change in temperature influences the optical scanning system 100 is described.

Figure 4A:
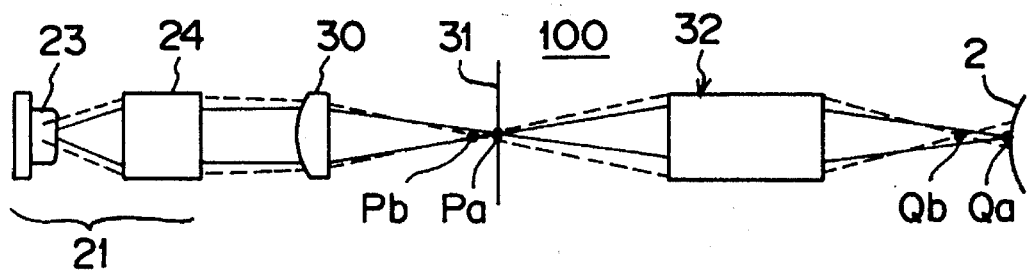
FIGS. 4a and 4b are views showing progression of a laser beam with no correction in respect to a sub-scanning direction and a main-scanning direction respectively.
Figure 4B:
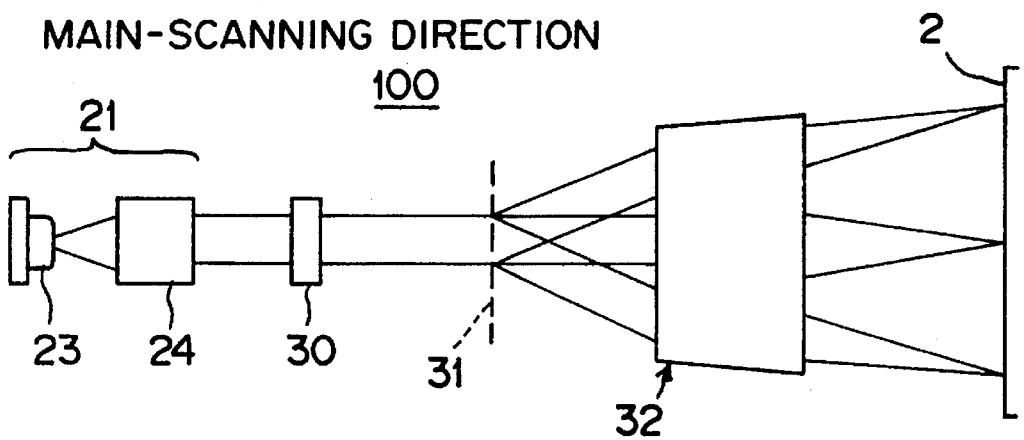

FIG. 4 shows progression of the laser beam. The progression of the beam under an ordinary temperature (20° C.) is indicated by a solid line, and the progression of the beam under a higher temperature is indicated by a dotted line. With a rise in temperature, the holder 22 expands, thereby increasing the distance between the laser diode 23 and the collimator lens 24. Referring to FIG. 4a, the progression of the beam is examined in respect to the sub-scanning direction. In a high temperature, the beam emergent from the collimator lens 24 is a convergent pencil of rays, and after passing through the cylindrical lens 30, the pencil of rays is imaged at a point Pb which is before a reflective facet of the polygonal mirror 31 (upstream of a regular mid image point Pa). The light is deflected on a plane at a constant angular velocity by the polygonal mirror 31, and after passing through the fθ lens 32, the light is imaged at a point Qb which is before the surface of the photosensitive drum 2 (upstream of a regular final image point Qa).

Thus, a rise in temperature moves the final image point of the optical scanning system 100 from Qa to Qb in respect to a direction of its optical axis, thereby causing defocus. With the defocus, the beam spot on the photosensitive drum 2 becomes large, and the energy density thereon becomes low. These result in narrow lines and a low image density on a finished image through electrophotographic processing.

Further, a fall in temperature causes a reverse change in the performance of the optical scanning system 100.

The cylindrical lens 30 has a power in the sub-scanning direction (a direction perpendicular to the plane of deflection), not in the main-scanning direction (a direction parallel with the plane of deflection). Therefore a change in temperature does not cause defocus in the main-scanning direction (see FIG. 4b).

In the light of these facts, in the first embodiment, the defocus is tried to be inhibited by making the cylindrical lens 30 out of resin and offsetting the change in the light converging performance of the laser source unit 21 by a change in performance of the cylindrical lens 30. When temperature rises, a resin lens increases its volume, that is, increases its radius of curvature, and decreases its refractive index. Both these changes lead to lengthening of its focal length. A glass lens makes similar changes with a change in temperature, but the changes are so small that they can be ignored.

Figure 5:
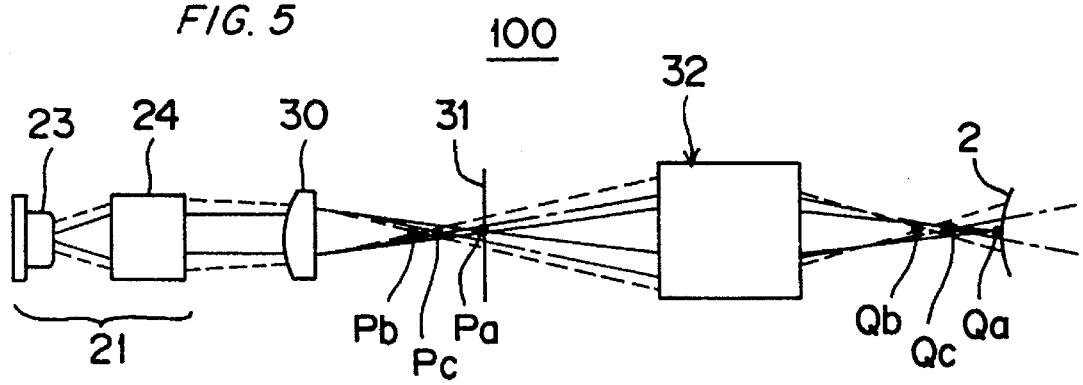
FIG. 5 is a view showing progression of the laser beam under a higher temperature with a correction in respect to the sub-scanning direction according to the first embodiment.

FIG. 5 shows progression of the beam in the optical scanning system 100 employing the resin cylindrical lens 30. When temperature rises, the focal length of the cylindrical lens 30 becomes longer. Thereby, the mid image point of the optical scanning system 100 is moved from Pb to Pc which is closer to the regular point Pa. Accordingly, the final image point is moved from Qb to Qc which is closer to the regular point Qa.

In this way, if a resin lens is used as the cylindrical lens 30, defocus caused by a change in the performance of the laser source unit 21 with a change in temperature can be offset by a change in the performance of the cylindrical lens 30. Proper setting of design values in respect to variable factors makes it possible to keep the influence of a change in temperature upon the optical scanning system 100 in such a low degree not to cause practical problems.

The influence of a change in temperature upon the optical scanning system 100 is hereinafter analyzed by use of expressions.

Figure 6:
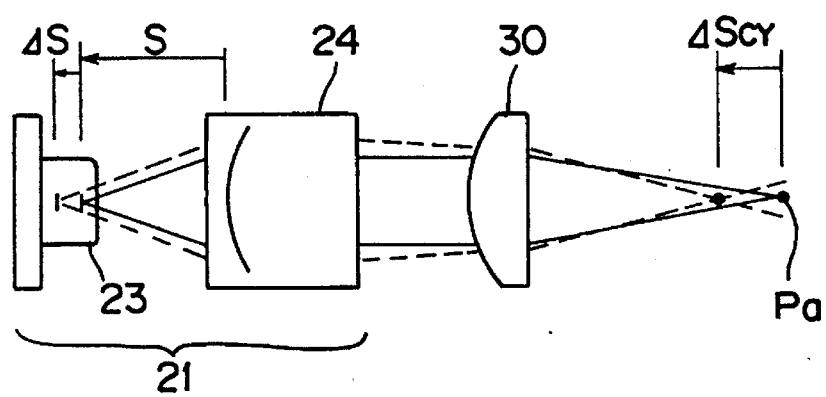
FIG. 6 is a view showing progression of the laser beam to a polygonal mirror according to the first embodiment.

First, referring to FIG. 6, a change in the distance between the laser diode 23 and the collimator lens 24 and a change in the location of the mid image point are described.

A variation $\Delta S$ in the distance $S$ between the laser diode 23 and the collimator lens 24 with a variation $\Delta T$ in temperature can be calculated by using an expression (1).

$$\Delta S \approx S k_S \Delta T \tag{1}$$

$k_S$: coefficient of linear expansion of the holder

A glass lens hardly changes its focal length according to temperature. Therefore if the cylindrical lens 30 is a glass lens, a variation $\Delta S_C'$ in the location of its image point with a change in temperature is substantially proportional to a variation $-\Delta S$ in the location of its object point. The variation $\Delta S_C'$ can be calculated by using an expression (2).

$$\Delta S_C' \approx \Delta S (f_{CY}/f_{CL})^2 \tag{2}$$

$f_{CY}$: focal length of the cylindrical lens
$f_{CL}$: focal length of the collimator lens On the other hand, if the cylindrical lens 30 is a resin lens, a variation in the location of its image point must be examined from two aspects of a change of the lens 30 (a change in shape resulting from thermal expansion and a change in refractive index).

The focal length $f_{CY}$ of the lens 30 can be expressed as follows.

$$f_{CY} = r_{CY}/(n_{CY}-1) \tag{3}$$

$r_{CY}$: radius of curvature of the cylindrical lens
$n_{CY}$: refractive index of the cylindrical lens A variation $\Delta f_{CY}$ in the focal length of the lens 30 when its radius of curvature $r_{CY}$ varies by $\Delta r_{CY}$ can be calculated as follows.

$$\Delta f_{CY} = \Delta r_{CY}/(n_{CY}-1) \tag{4}$$

From the expressions (3) and (4), an expression (5) to calculate a variation $\Delta f_{CY}$ in the focal length of the lens 30 with a variation $\Delta r_{CY}$ in its radius of curvature is obtained.

$$\Delta f_{CY} = f_{CY} \Delta r_{CY}/r_{CY} \tag{5}$$

A variation $\Delta f_{CY}$ in the focal length of the lens 30 when its refractive index $n_{CY}$ varies by $\Delta n_{CY}$ can be calculated by using an expression (6) which is based on the expression (3).

$$\Delta f_{CY} = -r_{CY} \Delta n_{CY}/(n_{CY}-1)^2 \tag{6}$$

From the expressions (3) and (6), an expression (7) to calculate a variation $\Delta f_{CY}$ in the focal length of the lens 30 with a variation $\Delta n_{CY}$ in its refractive index is obtained.

$$\Delta f_{CY} = -f_{CY} \Delta n_{CY}/(n_{CY}-1) \tag{7}$$

Consequently, a variation $\Delta f_{CY}$ in the focal length of the cylindrical lens 30 with a change in temperature can be expressed by an expression (8), based on the expressions (5) and (7).

$$\Delta f_{CY} = f_{CY}[\Delta r_{CY}/r_{CY} - \Delta n_{CY}/(n_{CY}-1)] \tag{8}$$

Since a parallel pencil of rays enters the cylindrical lens 30 in the optical system 100, a variation $\Delta S_C$ in the location of the mid image point can be expressed by an expression (9).

$$\Delta S_C = \Delta f_{CY} \tag{9}$$

Now a variation in the location of the mid image point with a change in temperature is tried to be figured out, referring to an example having the following design values.

focal length of the collimator lens: $f_{CL}=10$ mm
distance between the laser diode and the collimator lens: $S=9$ mm
material of the holder: aluminum
coefficient of linear expansion of the holder: $k_S=23 \times 10^{-6}/°C$.
focal length of the cylindrical lens: $f_{CY}=150$ mm
material of the cylindrical lens: acrylic resin
coefficient of linear expansion of the cylindrical lens: $k_{CY}=70 \times 10^{-6}/°C$.
refractive index of the cylindrical lens: $n_{CY}=1.483$
coefficient of refractive index increase of the cylindrical lens: $k_N=-11 \times 10^{-5}/°C$.

A variation $\Delta S$ in the distance $S$ when a variation $\Delta T$ in temperature is +30° C. is calculated at 0.0062 mm by using the expression (1). A variation $\Delta S_C'$ in the location of the mid image point caused by the variation $\Delta S$ is calculated at −1.40 mm by using the expression (2).

If the cylindrical lens 30 expands with heat symmetrically, a variation $\Delta r_{CY}$ in its radius of curvature with a change in temperature can be calculated by using an expression (10).

$$\Delta r_{CY} = r_{CY} k_{CY} \Delta T \tag{10}$$

When a variation $\Delta T$ in temperature is +30° C., $\Delta r_{CY}/r_{CY}$ is calculated at 0.0021.

A variation $\Delta n_{CY}$ in the refractive index with a change in temperature can be expressed by an expression (11), and it is calculated at −0.0033 when $\Delta T$ is +30° C.

$$\Delta n_{CY} = k_N \Delta T \quad (11)$$

A variation $\Delta S_C$ in the location of the mid image point caused by a change in the focal length of the cylindrical lens 30 with the change in temperature ($\Delta T=+30°$ C.) is calculated at 1.38 mm by substituting the calculated values into the expressions (8) and (9).

The variations $\Delta S_C'$ and $\Delta S_C$ are offset by each other. In other words, an actual variation $\Delta S_{CY}$ in the location of the mid image point can be expressed by $\Delta S_C' + \Delta S_C$. Accordingly, an actual variation $\Delta S_{CY}$ in the location of the mid image point with a rise in temperature by 30° C. is −0.02 mm (−1.40+1.38).

If the optical scanning system 100 is made according to the above design values, defocus of the mid image point with a change in temperature can be inhibited to a very low degree, thereby inhibiting defocus of the final image point.

Additionally, exemplary design values of the fθ lens 32 are presented. Its focal length $f_f$ in respect to the main-scanning direction is 270 mm, and its magnification in the sub-scanning direction is −1.5. In respect to the main-scanning direction, the ratio of a focal length $f_{CYM}$ of the cylindrical lens 30 to the focal length $f_f$ of the fθ lens 32 is as follows.

$$f_{CYM}/f_f = \infty \quad (12)$$

In respect to the sub-scanning direction, the ratio of the focal length $f_{CY}$ of the cylindrical lens 30 to the focal length $f_{CL}$ of the collimator lens 24 is as follows.

$$f_{CY}/f_{CL} = 15 \quad (13)$$

The adjusting (offsetting) effect of the cylindrical lens 30 does not act upon the main-scanning. In other words, the cylindrical lens 30 has such a small power in the main-scanning direction as not to be influenced by a change in temperature, and the cylindrical lens 30 hardly influences the size of a beam spot in the main-scanning direction. However, a change in the distance S between the laser diode 23 and the collimator lens 24 does not influence the main-scanning, and therefore adjusting in the main-scanning direction is not necessary.

Next, conditions which inhibit influence of a change in temperature on the optical scanning system 100 are tried to be found out.

As is apparent from the above example, if defocus resulting from a change in the performance of the laser source unit 21 and defocus resulting from a change in the performance of the cylindrical lens 30 are in the same degree, an actual variation $\Delta S_{CY}$ in the location of the mid image point with a change in temperature is very small. If the optical scanning system 100 is so made that $\Delta S_C$ (variation in the location of the mid image point caused by a change in the performance of the resin cylindrical lens 30) is from −0.5 to −1.5 times $\Delta S_C'$ (variation in the location of the mid image point caused by a change in the performance of the laser source unit 21), defocus with a change in temperature can be reduced to a half degree of that in a case of not using a resin cylindrical lens.

The ratio K of $\Delta S_C$ to $\Delta S_C'$ can be expressed by an expression (21), based on the expressions (2), (8) and (9).

$$K \approx \frac{f_{CY}[\Delta r_{CY}/r_{CY} - \Delta n_{CY}/(n_{CY}-1)]}{-\Delta S (f_{CY}/f_{CL})^2} \quad (21)$$

Practically, thermal expansion of the cylindrical lens 30 is very little, and $\Delta r_{CY}$ is substantially 0. Accordingly, an expression (22) can be obtained.

$$K \approx \frac{f_{CY} \Delta n_{CY}/(n_{CY}-1)}{\Delta S (f_{CY}/f_{CL})^2} \quad (22)$$

Further, an expression (23) can be obtained by substituting the expressions (1) and (11) into the expression (22).

$$K \approx \frac{f_{CL}^2 k_N}{k_S S f_{CY}(n_{CY}-1)} \quad (23)$$

Since the distance S between the laser diode 23 and the collimator lens 24 is nearly equal to the focal length $f_{CL}$ of the collimator lens 24, an expression (24) can be obtained.

$$K \approx \frac{f_{CL}}{k_S f_{CY}} \times \frac{k_N}{(n_{CY}-1)} \quad (24)$$

In the above example, a variation in the location of the mid image point with a change in temperature is very small. Therefore conditions of proper focus adjustment are examined based on the design values used in the example.

When the above-mentioned design values are substituted into the expression (24), the ratio K is approximately 0.6. If the coefficient of refractive index increase $k_N$ and the refractive index $n_{CY}$ of the cylindrical lens 30 are the above-mentioned values ($-11 \times 10^{-5}$ and 1.483 respectively), the collimator lens 24 and the cylindrical lens 30 must be so made as to meet a condition indicated by an expression (25).

$$K_1 = f_{CL}/(k_S f_{CY}) = 2900 \quad (25)$$

If the coefficient of linear expansion $k_S$ of the holder 22 is the above-mentioned value ($23 \times 10^{-6}$), the collimator lens 24 and the cylindrical lens 30 must have focal lengths which meet a condition indicated by an expression (26).

$$K_2 = f_{CL}/f_{CY} = 1/15 \quad (26)$$

If the optical scanning system 100 is so made as to meet the conditions indicated by the expressions (24), (25) and (26), defocus with a change in temperature can be properly corrected. As long as the optical scanning system 100 is so made that K, $K_1$ and $K_2$ are from 0.5 to 1.5 times the above-mentioned values (0.6, 2900 and 1/15 respectively), defocus caused by a change in the performance of the laser source unit 21 with a change in temperature can be reduced by at least 50%. Specifically concerning the expression (26), as long as the optical scanning system 100 meets a condition $7 \leq f_{CY}/f_{CL} \leq 23$, the defocus is reduced by at least 50%. In the first embodiment, the focal lengths of the collimator lens 24 and the cylindrical lens 30 are so designed as to meet $f_{CY}/f_{CL} = 15$. If the optical scanning system 100 is so made that $f_{CY}/f_{CL}$ is from 0.8 to 1.2 times 15, the defocus resulting from a change in the performance of the laser source unit 21 with a change in temperature can be reduced by 80%.

Figure 8:
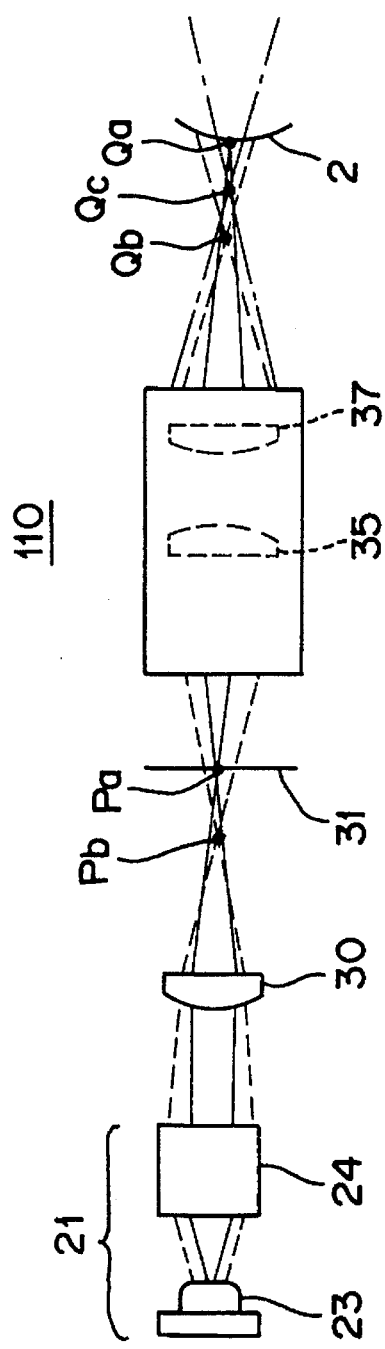
FIG. 8 is a view showing progression of the laser beam under a higher temperature with a correction according to the second embodiment.
Figure 9:
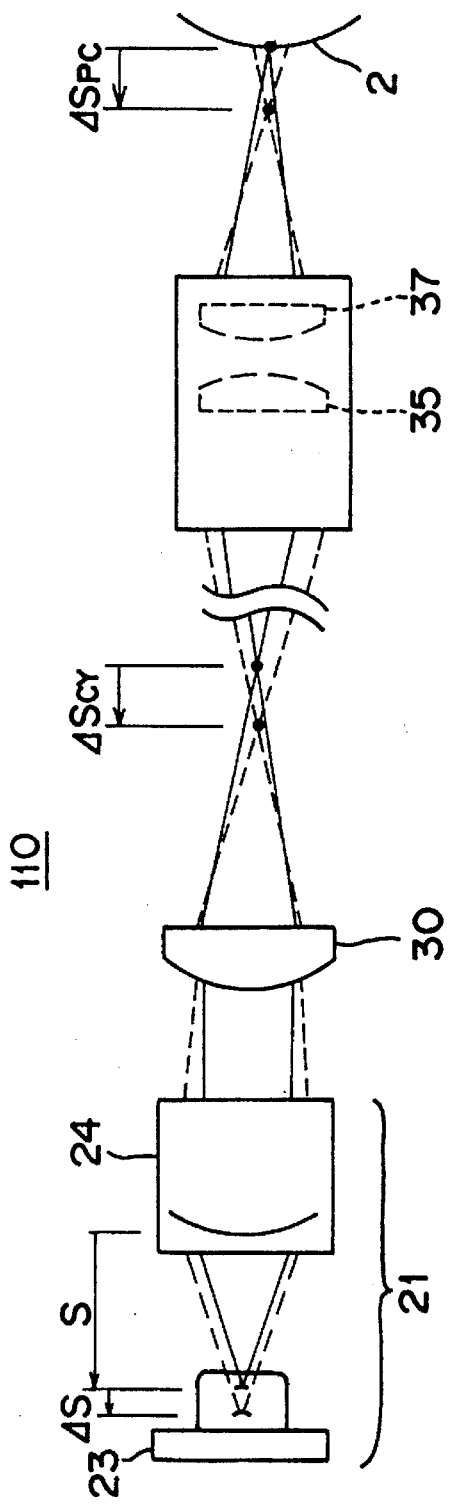
FIG. 9 is a view showing progression of the laser beam under a higher temperature with a correction according to the second embodiment.

Second Embodiment: See FIGS. 7–9

An optical scanning system 110 of a second embodiment has an fθ lens system composed of a spherical concave lens 34, a toroidal lens 35 having a toric surface, a spherical convex lens 36 and a second cylindrical lens 37 disposed between the plane mirror 33 and the photosensitive drum 2. The other components of the second embodiment are the same as those of the first embodiment. In the second embodiment, the toroidal lens 35 and the second cylindrical lens 37 are made of resin so that defocus caused by a change in the light converging performance of the laser source unit 21 with a change in temperature will be offset by a change in performance of the resin lenses 35 and 37. Further, the (first) cylindrical lens 30 which is disposed immediately after the laser source unit 21 is made of glass.

As described in connection with the first embodiment, with a rise in temperature, the laser source unit 21 changes its performance, thereby moving the final image point from the regular point Qa to a point Qb. In the second embodiment, meanwhile, the focal lengths of the resin toroidal lens 35 and the resin second cylindrical lens 37 become longer, thereby moving the final image point from the point Qb to a point Qc which is closer to the regular point Qa. These changes are hereinafter analyzed by use of expressions.

A variation $\Delta S$ in the distance S between the laser diode 23 and the collimator lens 24 with a change in temperature and a variation $\Delta S_C'$ in the location of the mid image point resulting from the variation $\Delta S$ can be calculated by using the expressions (1) and (2) respectively. If all the lenses of the optical scanning system 110 are glass lenses, a variation $\Delta S_F'$ in the location of the final image point can be calculated by using an expression (2').

$$\Delta S_F' = \Delta S_C' \beta_f^2 \qquad (2')$$

$\beta_f$: magnification of the f$\theta$ lens system in the sub-scanning direction In the second embodiment, the toroidal lens 35 is made of resin and therefore changes its focal length according to temperature. A change in the focal length of the resin toroidal lens 35 with a change in temperature must be examined from two aspects, a change in its shape and a change in its refractive index. The focal length $f_T$ of the toroidal lens 35 is expressed as follows.

$$f_T = r_T/(n_T - 1) \qquad (33)$$

$r_T$: radius of curvature of the toroidal lens
$n_T$: refractive index of the toroidal lens A variation $\Delta f_T$ in the focal length of the toroidal lens 35 when its radius of curvature $r_T$ varies by $\Delta r_T$ is expressed as follows.

$$\Delta f_T = \Delta r_T/(n_T - 1) \qquad (34)$$

From the expressions (33) and (34), an expression (35) to calculate a variation $\Delta f_T$ in the focal length of the lens 35 with a variation $\Delta r_T$ in its radius of curvature can be obtained.

$$\Delta f_T = f_T \Delta r_T/r_T \qquad (35)$$

A variation $\Delta f_T$ in the focal length of the toroidal lens 35 when its refractive index $n_T$ varies by $\Delta n_T$ can be expressed by an expression (36) which is based on the expression (33).

$$\Delta f_T = -r_T \Delta n_T/(n_T - 1)^2 \qquad (36)$$

By substituting the expression (33) into the expression (36), an expression (37) to calculate a variation $\Delta f_T$ in the focal length of the lens 35 with a variation $\Delta n_T$ in its refractive index can be obtained.

$$\Delta f_T = -f_T \Delta n_T/(n_T - 1) \qquad (37)$$

Consequently, a variation $\Delta f_T$ in the focal length of the toroidal lens 35 with a change in temperature can be expressed by an expression (38), based on the expressions (35) and (37).

$$\Delta f_T = f_T [\Delta r_T/r_T - \Delta n_T/(n_T - 1)] \qquad (38)$$

In the second embodiment, the glass spherical concave lens 34, the resin toroidal lens 35, the glass spherical convex lens 36 and the resin second cylindrical lens 37 form the f$\theta$ lens system. Both of the resin lenses 35 and 37 have powers in the sub-scanning direction but substantially no powers in the main-scanning direction. Accordingly, influence of this f$\theta$ lens system upon image formation is described only in respect to the sub-scanning direction.

A variation $\Delta S_T'$ in the location of the final image point when the focal length $f_T$ of the toroidal lens 35 varies by $\Delta f_T$ can be calculated by using an expression (41).

$$\Delta S_T' = \Delta f_T (S_T'/f_T)^2 \qquad (41)$$

$S_T'$: distance between the toroidal lens and the photosensitive drum

A variation $\Delta S_T$ in the location of the object point of the toroidal lens 35 can be calculated from the variation $\Delta S_T'$ by using an expression (42).

$$\Delta S_T = \Delta S_T'/\beta_T^2 \qquad (42)$$

$\beta_T$: magnification of the toroidal lens

The magnification $\beta_T$ can be calculated by using an expression (43).

$$\beta_T = S_T'/S_T \qquad (43)$$

$S_T$: distance between the toroidal lens and the polygonal mirror

An expression (44) can be obtained by substituting the expressions (41) and (43) into the expression (42).

$$\Delta S_T = \Delta f_T (S_T/f_T)^2 \qquad (44)$$

A variation $\Delta S_1$ in the location of the object point of the toroidal lens 35 with the spherical concave lens 34 in between can be calculated from the variation $\Delta S_T$ by using an expression (45).

$$\Delta S_1 = \Delta S_T/\beta_1^2 \qquad (45)$$

$\beta_1$: magnification of the spherical concave lens

A variation $\Delta S_{T1}'$ in the location of the final image point resulting from the variation $\Delta S_1$ can be calculated by using an expression (46).

$$\Delta S_{T1}' = \Delta S_1 \beta_f^2 \qquad (46)$$

An expression (47) can be obtained from the expressions (44), (45) and (46).

$$\Delta S_{T1}' = \Delta f_T (S_T \beta_f/f_T \beta_1)^2 \qquad (47)$$

Practically, the spherical concave lens 34 acts upon image formation very little. The reasons are that the spherical concave lens 34 is disposed near the polygonal mirror 31 and that the focal length of the spherical concave lens 34 is long. For example, if the f$\theta$ lens system as a whole is designed to have a focal length of 300 mm, the spherical concave lens 34 is designed to have a focal length of approximately −700 mm. Therefore $\beta_1$ is substantially 1. Accordingly, an expression (48) can be obtained.

$$\Delta S_{T1}' = \Delta f_T (S_T \beta_f/f_T)^2 \qquad (48)$$

In the second embodiment, the second cylindrical lens 37 as well as the toroidal lens 35 is made of resin and therefore changes its focal length according to temperature.

A variation $\Delta f_{CY2}$ in the focal length of the second cylindrical lens 37 with a change in temperature can be calculated in the same manner as that of the toroidal lens 35. Like the analysis of the toroidal lens 35, a change in the focal length of the second cylindrical lens 37 must be examined from two aspects, a change in its shape and a change in its refractive index. Like the expression (38), a variation $\Delta f_{CY2}$ in the focal length of the second cylindrical lens 37 can be expressed by an expression (49).

$$\Delta f_{CY2} = f_{CY2}[\Delta r_{CY2}/r_{CY2} - \Delta n_{CY2}/(n_{CY2} - 1)] \qquad (49)$$

$f_{CY2}$: focal length of the second cylindrical lens
$r_{CY2}$: radius of curvature of the second cylindrical lens
$\Delta r_{CY2}$: variation in the radius of curvature of the second cylindrical lens
$n_{CY2}$: refractive index of the second cylindrical lens
$\Delta n_{CY2}$: variation in the refractive index of the second cylindrical lens A variation $\Delta S_P$ in the location of the final image point caused by a change in the focal length of the second cylindrical lens 37 can be calculated by using an expression (50).

$$\Delta S_P = \Delta f_{CY2}(S_P/f_{CY2})^2 \qquad (50)$$

$S_P$: distance between the second cylindrical lens and the photosensitive drum

Now a variation in the location of the final image point with a change in temperature is tried to be figured out, referring to an example having the following design values.

focal length of the collimator lens: $f_{CL}=10$ mm
distance between the laser diode and the collimator lens: $S=8$ mm
material of the holder: aluminum
coefficient of linear expansion of the holder: $k_S=23\times10^{-6}/°C$.
focal length of the first cylindrical lens: $f_{CY}=150$ mm
focal length of the toroidal lens: $f_T=75$ mm
material of the toroidal lens: acrylic resin
coefficient of linear expansion of the toroidal lens: $k_T=70\times10^{-6}/°C$.
refractive index of the toroidal lens: $n_T=1.483$
coefficient of refractive index increase of the toroidal lens: $k_N=-11\times10^{-5}/°C$.
focal length of the second cylindrical lens: $f_{CY2}=100$ mm
material of the second cylindrical lens: acrylic resin
coefficient of linear expansion of the second cylindrical lens: $k_{CY2}=70\times10^{-6}/°C$.
refractive index of the second cylindrical lens: $n_{CY2}=1.483$
coefficient of refractive index increase of the second cylindrical lens: $k_N=-11\times10^{-5}/°C$.
distance between the toroidal lens and the polygonal mirror: $S_T=-65$ mm
distance between the second cylindrical lens and the photosensitive drum: $S_P=90$ mm
magnification of the fθ lens system in the sub-scanning direction: $\beta_f=-1.5$ A case wherein temperature rises by 30° C. ($\Delta T=+30$) is hereinafter described. A variation $\Delta S$ in the distance S is calculated at 0.0055 mm by using the expression (1), and a variation $\Delta S_P'$ in the location of the final image point resulting from the variation $\Delta S$ is calculated at −2.79 mm by using the expression (2').

If the toroidal lens 35 expands with heat symmetrically, a variation $\Delta r_T$ in its radius of curvature with a change in temperature can be calculated by using an expression (51).

$$\Delta r_T = r_T k_T \Delta T \qquad (51)$$

When a variation $\Delta T$ in temperature is +30° C., $\Delta r_T/r_T$ is calculated at 0.0021 by substituting the abovementioned values into the expression (51).

A variation $\Delta n_T$ in the refractive index of the toroidal lens 35 with a change in temperature can be expressed by an expression (52), and it is calculated at −0.0033 when $\Delta T$ is +30° C.

$$\Delta n_T = k_N \Delta T \qquad (52)$$

A variation $\Delta S_{T1}'$ in the location of the final image point resulting from a change in the focal length of the toroidal lens 35 with the change in temperature ($\Delta T=+30°$ C.) is calculated at 1.13 mm by substituting the calculated values into the expressions (38) and (48).

A variation $\Delta S_P$ in the location of the final image point resulting from a change in the focal length of the second cylindrical lens 37 with a change in temperature can be calculated in the same manner as the variation $\Delta S_{T1}'$. First, by using an expression similar to the expression (51), $\Delta r_{CY2}/r_{CY2}$ is calculated at 0.0021. By using an expression similar to the expression (52), a variation $\Delta n_{CY2}$ in the refractive index of the second cylindrical lens 37 is calculated at −0.0033. The variation $\Delta S_P$ in this case is calculated at 0.72 mm by substituting the calculated values into the expressions (49) and (50).

The variations $\Delta S_P'$, $\Delta S_{T1}'$ and $\Delta S_P$ are offset by one another, and an actual variation $\Delta S_{PC}$ in the location of the final image point is expressed by $\Delta S_P' + \Delta S_{T1}' + \Delta S_P$. Accordingly, when temperature rises by 30° C., an actual variation $\Delta S_{PC}$ in the location of the final image point is −0.94 mm (−2.79+1.13+0.72).

If the optical scanning system 110 is made according to the above design values, defocus around the photosensitive drum 2 with a change in temperature can be inhibited to a very low degree.

Further, the adjusting (offsetting) effect of the fθ lens system does not act upon the main-scanning. In other words, the fθ lens system has such a small power in the main-scanning direction as not to be influenced by a change in temperature, and the fθ lens system hardly influences the size of a beam spot in the main-scanning direction. However, a change in the distance S between the laser diode 23 and the collimator lens 24 does not influence the main-scanning, and therefore adjusting in the main-scanning direction is not necessary.

Table 1 shows an exemplary composition of the second embodiment. In this composition, the focal length $f_f$ of the fθ lens system as a whole is 300 mm. In respect to the main-scanning direction, the focal length $f_{TM}$ of the toroidal lens 35 is 1202 mm, and the focal length $f_{CY2M}$ of the second cylindrical lens 37 is an infinity. Accordingly, the ratio of $f_{TM}$ to $f_f$ and the ratio of $f_{CY2M}$ to $f_f$ can be expressed as follows.

$$f_{TM}/f_f = 4.0 \qquad (61)$$

$$f_{CY2M}/f_f = \infty \qquad (62)$$

TABLE 1

| | radius of curvature (mm) | | | |
| --- | --- | --- | --- | --- |
| | direction parallel with plane of deflection | direction perpendicular to plane of deflection | distance (mm) | refractive index |
| first cylindrical lens | ∞ | 76.7 | 5 | 1.51117 |
| | | ∞ (plane side) | | |
| | | | 157.6 | |
| polygonal mirror | | ∞ (plane side) | | |
| | | | 24 | |
| fθ lens system — spherical concave lens | −600 (spherical side) | | 9 | 1.51117 |
| | 900 | | | |
| | | | 39 | |
| fθ lens system — toroidal lens | −55 | ∞ | 9 | 1.483 |
| | −64 | −60 | | |
| | | | 1.5 | |
| fθ lens system — spherical convex lens | −990 (spherical side) | | 19 | 1.78571 |
| | −141 (spherical side) | | | |
| | | | 250 | |
| second cylindrical lens | ∞ | 48.3 | 5 | 1.483 |
| | ∞ (plane side) | | | |
| | | | 95 | |

Third Embodiment

A third embodiment has basically the same structure as the optical scanning system 110 of the second embodiment. In the third embodiment, however, only the second cylindrical lens 37 is made of resin, and the toroidal lens 35 is made of glass. The third embodiment is described, referring to FIG. 7.

Since the toroidal lens 35 is a glass lens, a change in the focal length of the lens 35 with a change in temperature can be ignored. A change in the location of the final image point with a change in temperature is caused by a change in the light converging performance of the laser source unit 21 and a change in the focal length of the second cylindrical lens 37, and only these two factors must be considered to inhibit defocus. All the expressions mentioned in the second embodiment other than the ones in respect to the toroidal lens 35 can be used in the third embodiment.

A change in the location of the final image point with a change in temperature according to the third embodiment is hereinafter described more specifically. All members of the third embodiment are so made to have the same design values as those of the second embodiment except that the focal length $f_{CY}$ of the first cylindrical lens 30 is 100 mm. Specifically, $f_{CL}$, S, the material and characteristics of the holder, the material and characteristics of the second cylindrical lens 37, $\beta_f$, etc. of the third embodiment are the same as those of the second embodiment. Like the second embodiment, the following description is in connection with a case wherein temperature rises by 30° C. ($\Delta T = +30°$ C.).

A variation $\Delta S$ in the distance S between the laser diode 23 and the collimator lens 24 with the rise in temperature is 0.0055 mm, and a variation $\Delta S_P'$ in the location of the final image point resulting from the variation $\Delta S$ is calculated at −1.24 mm by using the expression (2').

A variation $\Delta S_P$ in the location of the final image point caused by a change in the focal length of the second cylindrical lens 37 with the rise in temperature is 0.72 mm which is the same as in the second embodiment.

The variations $\Delta S_P'$ and $\Delta S_P$ are offset by each other, and an actual variation $\Delta S_{PC}$ in the location of the final image point is −0.52 mm (−1.24+0.72).

Table 2 shows an exemplary composition of the third embodiment. In this composition, the focal length $f_f$ of the fθ lens system as a whole is 300 mm, and the focal length $f_{CY2M}$ of the second cylindrical lens 37 in respect to the main-scanning direction is an infinity. Accordingly, the relation between $f_{CY2M}$ and $f_f$ is expressed by $f_{CY2M}/f_f = \infty$.

TABLE 2

| | radius of curvature (mm) | | | |
| --- | --- | --- | --- | --- |
| | direction parallel with plane of deflection | direction perpendicular to plane of deflection | distance (mm) | refractive index |
| first cylindrical lens | ∞ | 51.1 | 5 | 1.51117 |
| | | ∞ (plane side) | | |
| | | | 98.6 | |
| polygonal mirror | | ∞ (plane side) | | |
| | | | 24 | |
| fθ lens system — spherical concave lens | −600 (spherical side) | | 9 | 1.51117 |
| | 900 | | | |
| | | | 39 | |
| fθ lens system — toroidal lens | −55 | ∞ | 9 | 1.51117 |
| | −64 | −60 | | |
| | | | 1.5 | |
| fθ lens system — spherical convex lens | −990 (spherical side) | | 19 | 1.78571 |
| | −141 (spherical side) | | | |
| | | | 250 | |
| second cylindrical lens | ∞ | 48.3 | 5 | 1.483 |
| | ∞ (plane side) | | | |
| | | | 95 | |

Position of the Second Cylindrical Lens

Now, the position of the second cylindrical lens 37 in the second embodiment and in the third embodiment is described.

It is preferred that the second cylindrical lens 37 is disposed away from the photosensitive drum 2, but not so far as to deteriorate the performance of the lens 37. The purposes of disposing the second cylindrical lens 37 away from the photosensitive drum 2 are as follows: (1) preventing the lens 37 from being smudged with toner smoke, (2) shortening the length of the lens 37 in the main-scanning direction and (3) keeping the magnification of the fθ lens system in the sub-scanning direction big enough to bring its adjusting effect sufficiently. Additionally speaking concerning the point (3), if the magnification of the fθ lens system in the sub-scanning direction becomes smaller, in order to keep obtaining a beam spot of the same diameter on the photosensitive drum 2, the focal length of the first cylindrical lens 30 disposed before the polygonal mirror 31 needs to be lengthened. However, this arrangement will make the positioning of the lens 30 difficult and make the optical scanning system 110 large as a whole.

In the light of these points, it is preferred that the distance between the second cylindrical lens 37 and the photosensitive drum 2 is at least ½ of the distance between the polygonal mirror 31 and the photosensitive drum 2. For example, if the distance between the polygonal mirror 31 and the photosensitive drum 2 is 420 mm, the second cylindrical lens 37 is disposed at a distance of at least 60 mm from the photosensitive drum 2.

Change in Image Size

In the first, the second and the third embodiments, optical elements which have strong powers in the main-scanning direction are not made of resin. If these optical elements are made of resin, a change in temperature will result in a change in size of an image on the photosensitive drum 2. This is mainly caused by a change in the focal length of the fθ lens system in the main-scanning direction.

If the fθ lens system is composed of two (first and second) optical elements, the relation among the fθ lens system as a whole, the first optical element and the second optical element can be expressed by an expression (71).

$$\psi_f = \psi_1 + \psi_2 - e\psi_1\psi_2 \tag{71}$$

$\psi_f$: power of the fθ lens system in the main-scanning direction $\psi_1, \psi_2$: powers of the first and the second optical elements in the main-scanning direction e: (calculated) distance between the first and the second optical elements A variation $\Delta\psi_f$ in the power of the fθ lens system when the power $\psi_2$ of the second optical element varies by $\Delta\psi_2$ with a change in temperature can be calculated as follows.

$$\Delta\psi_f = \Delta\psi_2 - e\psi_1\psi_2 \tag{72}$$

Since $e\psi_1\Delta\psi_2$ is very small, an expression (73) can be obtained.

$$\Delta\psi_f = \Delta\psi_2 \tag{73}$$

Even if the fθ lens system has more than two optical elements, the relation among the fθ lens system and its optical elements can be considered in the same manner. A variation $\Delta\psi_f$ in the power $\psi_f$ of the fθ lens system when the power $\psi_1$ of an optical element i varies by $\Delta\psi_1$ can be expressed by an expression (74).

$$\Delta\psi_f = \Delta\psi_i \tag{74}$$

When the relation is expressed based on focal length ($\psi = 1/f$ and accordingly $\Delta\psi = -\Delta f/f^2$, f: focal length), an expression (75) can be obtained.

$$\Delta f_f/f_f^2 = \Delta f_i/f_i^2 \tag{75}$$

$f_f$: focal length of the fθ lens system in the main-scanning direction $f_i$: focal length of the optical element i in the main-scanning direction The size I of an image on the photosensitive drum 2 changes in proportion to the focal length $f_f$ of the fθ lens system. Accordingly, a variation $\Delta I$ in the image size I can be expressed by an expression (76).

$$\Delta I/I = \Delta f_f/f_f \tag{76}$$

Conditions which inhibit the image size I from varying remarkably are tried to be found out. First, an expression (77) can be obtained from the expression (75).

$$f_f = (f_f^2/\Delta f_f)(\Delta f_i/f_i) \tag{77}$$

An expression (78) can be obtained by substituting the expression (77) into the expression (76).

$$f_f = f_i(I/\Delta I)(\Delta f_i/f_i) \tag{78}$$

A condition of keeping a variation $\Delta I$ in the image size within a tolerable range from 0 to $\Delta I'$ ($|\Delta I| < |\Delta I'|$) is as follows.

$$|f_i| > |f_i(I/\Delta I')(\Delta f_i/f_i)| \tag{79}$$

Now specific values are used to set the condition. Here are used the design values mentioned in the second embodiment. Suppose that $\Delta I'/I$ is 0.005. A variation $\Delta f_i$ in the focal length $f_i$ of the optical element i with a change in temperature can be calculated by using an expression similar to the expression (8). When the variation $\Delta T$ in temperature is +30° C., $\Delta f_i/f_i$ is calculated at 0.009. However, if the optical element i is a curve mirror performing surface reflection, a change in the refractive index with a change in temperature is so small that it can be ignored, and therefore $\Delta f_i/f_i$ is 0.002.

By substituting $\Delta I'/I = 0.005$ and $\Delta f_i/f_i = 0.009$ into the expression (79), an expression (80) expressing a condition of $|\Delta I| < |\Delta I'|$ can be obtained.

$$|f_f/f_i| > 9/5 = 1.8 \tag{80}$$

In the same manner, an expression (81) expressing a condition of $|\Delta I| < |\Delta I'|$ when the optical element i is a mirror can be obtained.

$$|f_f/f_i| > 2/5 = 0.4 \tag{81}$$

An optical element i which meets the condition (80) or (81) should be made of resin.

Table 3 shows the values $|f_f/f_i|$ in the first, the second and the third embodiments, and all the cases meet the condition (80).

TABLE 3

| embodiment | first | second | third |
|---|---|---|---|
| $|f_1/f_f|$ | ∞ | 4.0 | ∞ |

Figure 10:
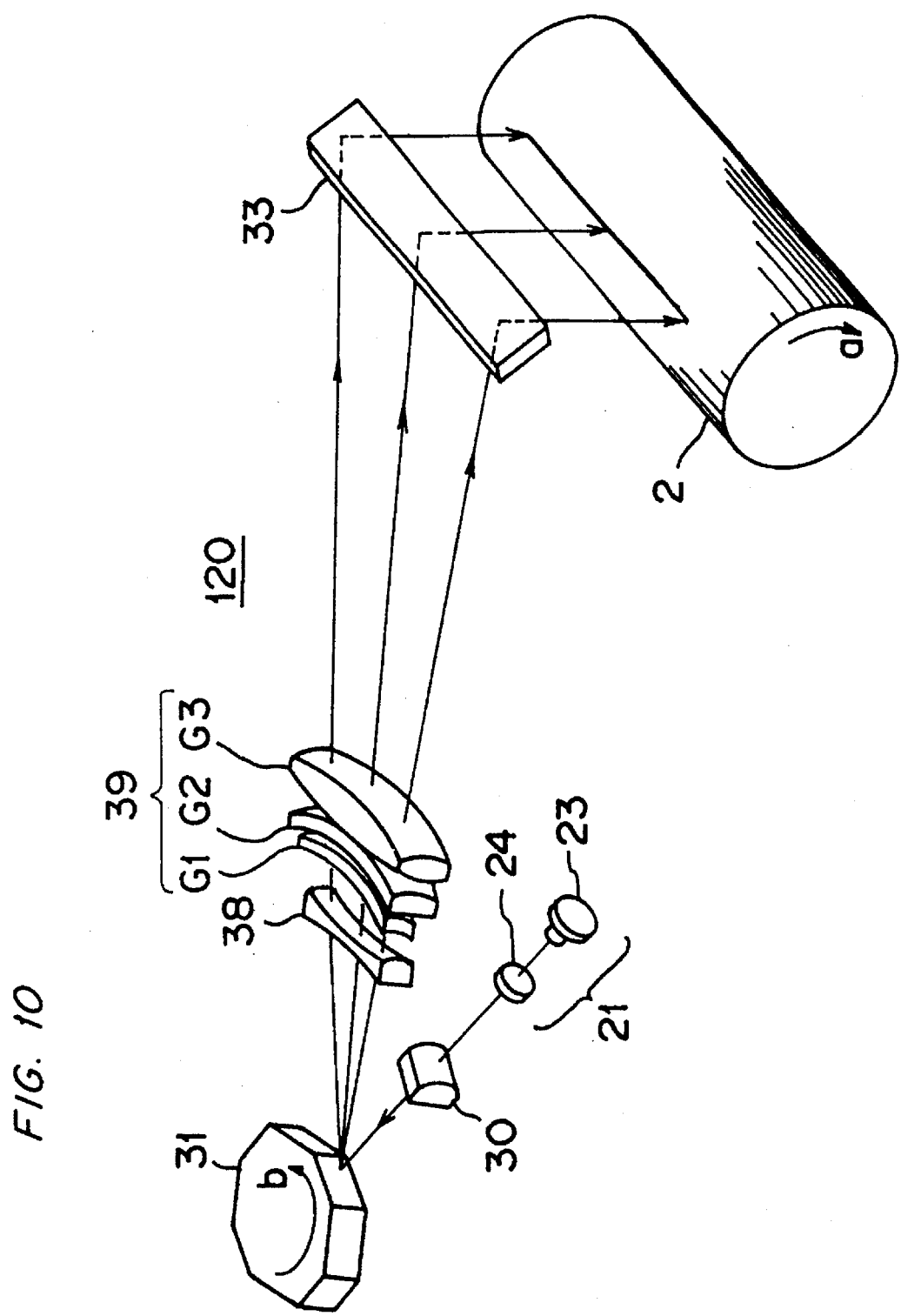
FIG. 10 is a perspective view of a laser beam optical scanning system of a fourth embodiment.
Figure 11:
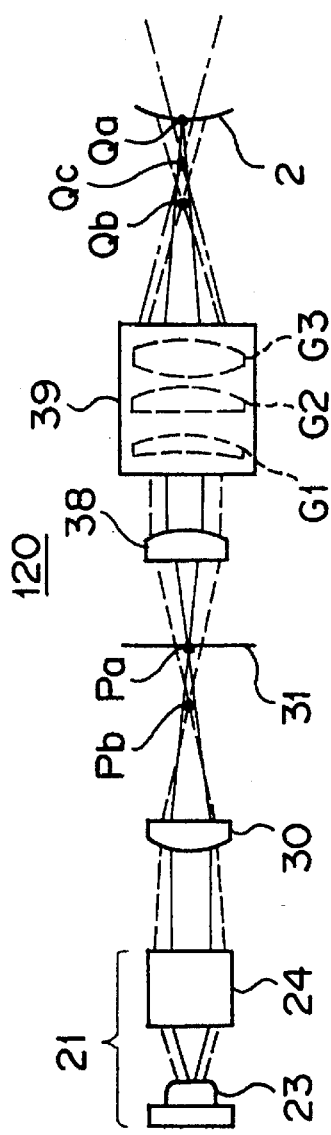
FIG. 11 is a view showing progression of the laser beam under a higher temperature with a correction according to the fourth embodiment.
Figure 12:
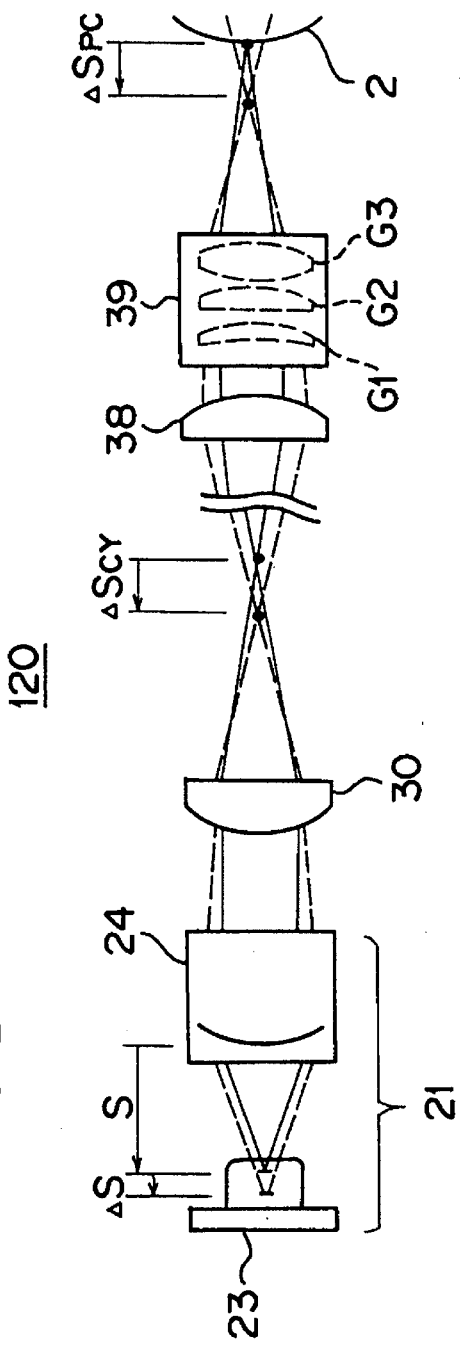
FIG. 12 is a view showing progression of the laser beam under a higher temperature with a correction according to the fourth embodiment.

Fourth Embodiment: See FIGS. 10–12

An optical scanning system 120 of a fourth embodiment has a toroidal lens 38 having a toric surface, and a spherical fθ lens system 39 composed of three lenses G1, G2 and G3. The other components of the fourth embodiment are the same as those of the first embodiment shown in FIG. 2. In the fourth embodiment, the toroidal lens 38 is made of resin so that defocus caused by a change in the light converging performance of the laser source unit 21 with a change in temperature will be offset by a change in performance of the resin lens 38. The cylindrical lens 30, and the lenses G1, G2 and G3 of the fθ lens system 39 are made of glass.

As described in connection with the first and the second embodiments, the distance S between the laser diode 23 and the collimator lens 24 becomes longer with a rise in temperature, which moves the final image point from the regular point Qa to a point Qb. In the fourth embodiment, meanwhile, the focal length of the toroidal lens 38 becomes longer, which moves the final image point from the point Qb to a point Qc which is closer to the regular point Qa.

These changes are hereinafter analyzed by use of expressions. A variation $\Delta S$ in the distance $S$ with a change in temperature and a variation $\Delta S_C'$ in the location of the mid image point caused by the variation $\Delta S$ are calculated by using the expressions (1) and (2). A variation $\Delta S_P'$ in the location of the final image point caused by the variation $\Delta S_C'$ is calculated by using the above-mentioned expression (2') or the following expression (2"). In connection with the fourth embodiment, $\beta_f$ in the expression (2') represents the magnification of a lens group of the toroidal lens 38 and the f$\theta$ lens system 39 in the sub-scanning direction.

$$\Delta S_P' = \Delta S_C'(f/f_T)^2 \tag{2"}$$

$f_f$: focal length of the f$\theta$ lens system
$f_T$: focal length of the toroidal lens A variation in the location of the final image point caused by a change in the focal length of the resin toroidal lens 38 with a change in temperature must be examined from two aspects, a change in its shape and a change in its refractive index. The focal length $f_T$ of the toroidal lens 38 can be calculated by using the expression (33), and a variation $\Delta f_T$ in the focal length $f_T$ when its radius of curvature $r_T$ varies by $\Delta r_T$ can be calculated by using the expressions (34) and (35).

A variation $\Delta f_T$ in the focal length of the toroidal lens 38 when its refractive index $n_T$ varies by $\Delta n_T$ is calculated by using the expressions (36) and (37). Consequently, a variation $\Delta f_T$ in the focal length of the toroidal lens 38 with a change in temperature can be expressed by the expression (38).

As long as the focal point (object point) of the toroidal lens 38 is identical to the mid image point, the final image point stays at the regular point Qa. A change in the focal length of the toroidal lens 38, which moves its object point, has the same influence on the final image point as a change in the location of the mid image point. Accordingly, a variation $\Delta S_P'$ in the location of the final image point caused by a change in the focal length of the toroidal lens 38 can be calculated by using an expression (91).

$$\Delta S_P' = \Delta f_T (f/f_T)^2 \tag{91}$$

Now a variation in the location of the final image point with a change in temperature is tried to be figured out, referring to an example having the following design values.

focal length of the collimator lens: $f_{CL}=8$ mm
distance between the laser diode and the collimator lens: $S=8$ mm
material of the holder: aluminum
coefficient of linear expansion of the holder: $k_S=23\times10^{-6}/°C$.
focal length of the cylindrical lens: $f_{CY}=72$ mm
focal length of the toroidal lens: $f_T=50$ mm
material of the toroidal lens: acrylic resin
coefficient of linear expansion of the toroidal lens: $k_T=70\times10^{-6}/°C$.
refractive index of the toroidal lens: $n_T=1.483$
coefficient of refractive index increase of the toroidal lens: $k_N=-11\times10^{-5}/°C$.
focal length of the f$\theta$ lens system: $f_f=200$ mm
magnification of the lens group of the toroidal lens and the f$\theta$ lens system in the sub-scanning direction: $\beta_f=-4$ A variation $\Delta S$ in the distance $S$ when a variation $\Delta T$ in temperature is $+30°$ C. is calculated at 0.0055 mm by using the expression (1). A variation $\Delta S_P'$ in the location of the final image point caused by the variation $\Delta S$ is calculated at $-7.15$ mm by using the expression (2").

If the toroidal lens 38 expands with heat symmetrically, a variation $\Delta r_T$ in its radius of curvature with a change in temperature can be calculated by using the expression (51). Accordingly, when a variation $\Delta T$ in temperature is $+30°$ C., $\Delta r_T/r_T$ is 0.0021.

A variation $\Delta n_T$ in the refractive index of the toroidal lens 38 with a variation $\Delta T$ in temperature can be calculated by using the expression (52), and when $\Delta T$ is $+30°$ C., the variation $\Delta n_T$ is calculated at $-0.0033$.

A variation $\Delta S_{T1}'$ in the location of the final image point caused by the variations $\Delta r_T$ and $\Delta n_T$ with the change in temperature ($\Delta T=+30°$ C.) is calculated at 7.14 mm by substituting the calculated values into the expressions (38) and (48).

The variations $\Delta S_P'$ and $\Delta S_{T1}'$ are offset by each other, and an actual variation $\Delta S_{PC}$ in the location of the final image point can be expressed by $\Delta S_P' + \Delta S_{T1}'$. Accordingly, an actual variation $\Delta S_{PC}$ in the location of the final image point when temperature rises by 30° C. is calculated at $-0.01$ mm ($-7.15+7.14$).

If the optical scanning system 120 is made according to the above design values, defocus with a change in temperature can be kept in a very low degree.

The adjusting (offsetting) effect of the toroidal lens 38 does not act upon the main-scanning. In other words, the toroidal lens 38 has such a small power in the main-scanning direction as not to be influenced by a change in temperature, and the toroidal lens 38 hardly influences the size of a beam spot in the main-scanning direction. However, a change in the distance $S$ between the laser diode 23 and the collimator lens 24 does not influence the main-scanning, and therefore adjusting in the main-scanning direction is not necessary.

Conditions which inhibit influence of a change in temperature on the optical scanning system 120 are tried to be found out. Specifically, conditions which prevent the final image point from moving remarkably with a change in temperature are examined.

As is apparent from the above example, if defocus resulting from a change in the performance of the laser source unit 21 and defocus resulting from a change in the focal length of the toroidal lens 38 are in the same degree, an actual variation $\Delta S_{PC}$ in the location of the final image point with a change in temperature is very small. If the optical scanning system 120 is so made that $\Delta S_{T1}'$ (variation in the location of the final image point caused by a change in the focal length of the resin toroidal lens 38) is from $-0.5$ to $-1.5$ times $\Delta S_P'$ (variation in the location of the final image point caused by a change in the performance of the laser source unit 21), defocus with a change in temperature can be reduced to a half degree of that in a case of not using a resin toroidal lens.

The ratio $K$ of $\Delta S_{T1}'$ to $\Delta S_P'$ can be expressed by an expression (92), based on the expressions (2"), (8) and (9).

$$K \approx \frac{f_T[\Delta r_T/r_T - \Delta n_T/(n_T-1)]}{-\Delta S (f_{CY}/f_{CL})^2} \tag{92}$$

Practically, thermal expansion of the toroidal lens 38 is very small, and $\Delta r_T$ is substantially 0. Accordingly, an expression (93) can be obtained.

$$K \approx \frac{f_T \Delta n_T/(n_T-1)}{\Delta S (f_{CY}/f_{CL})^2} \tag{93}$$

Further, an expression (94) can be obtained by substituting the expressions (1) and (11) into the expression (93).

$$K \approx \frac{f_T f_{CL}^2 k_N}{k_S S f_{CY}^2 (n_{CY}-1)} \quad (94)$$

Since the distance S between the laser diode 23 and the collimator lens 24 is nearly equal to the focal length $f_{CL}$ of the collimator lens 24, an expression (95) can be obtained.

$$K \approx \frac{f_T f_{CL}}{k_S f_{CY}^2} \times \frac{k_N}{(n_{CY}-1)} \quad (95)$$

In the above example, a variation in the location of the final image point with a change in temperature is very small. Therefore conditions of proper focus adjustment are examined based on the design values used in the example.

When the above-mentioned design values are substituted into the expression (95), the ratio K is approximately 0.76. If the coefficient of refractive index increase $k_N$ and the refractive index $n_T$ of the toroidal lens 38 are the above-mentioned values ($-11 \times 10^{-5}$ and 1.483 respectively), the optical scanning system 120 should be so made as to meet a condition indicated by an expression (96).

$$K_1 \approx f_{CL} f_T / (k_S f_{CY}^2) = 3350 \quad (96)$$

If the coefficient of linear expansion $k_S$ of the holder 22 is the above-mentioned value ($23 \times 10^{-6}$), the collimator lens 24, the cylindrical lens 30 and the toroidal lens 38 must have focal lengths which meet a condition indicated by an expression (97).

$$K_2 \approx f_{CL} f_T / f_{CY}^2 = 0.077 \quad (97)$$

If the optical scanning system 120 is so made as to meet the conditions indicated by the expressions (95), (96) and (97), defocus can be properly corrected. As long as the optical scanning system 120 is so made that K, $K_1$ and $K_2$ are from 0.5 to 1.5 times the above-mentioned values (0.76, 3350 and 0.077 respectively), defocus caused by a change in the performance of the laser source unit 21 with a change in temperature can be reduced by at least 50%. If the optical scanning system 120 is so made that K, $K_1$ and $K_2$ are from 0.8 to 1.2 times the above-mentioned values, defocus caused by a change in the performance of the light source unit 21 with a change in temperature can be reduced by 80%.

Table 4 shows an exemplary composition of the fourth embodiment. In this composition, the focal length $f_{CY}$ of the cylindrical lens 30 is 64 mm, the distance between the polygonal mirror 31 and the toroidal lens 38 is 44 mm, and the magnification $\beta_f$ of the lens group of the toroidal lens 38 and the f$\theta$ lens system 39 in the sub-scanning direction is $-4.5$.

TABLE 4

| | | radius of curvature (mm) | | | |
|---|---|---|---|---|---|
| | | direction parallel with plane of deflection | direction perpendicular to plane of deflection | distance (mm) | refractive index |
| cylindrical lens | | $\infty$ | 32.7 | | |
| | | | | 5 | 1.51118 |
| | | $\infty$ (plane side) | | | |
| | | | | 62 | |
| polygonal mirror | | $\infty$ (plane side) | | | |
| | | | | 44 | |
| | | $-50$ | $\infty$ | | |
| toroidal lens | | | | 5 | 1.483 |

TABLE 4-continued

| | | radius of curvature (mm) | | | |
|---|---|---|---|---|---|
| | | direction parallel with plane of deflection | direction perpendicular to plane of deflection | distance (mm) | refractive index |
| | | 55 | $-24.15$ | | |
| | | | | 7 | |
| | | | $-46.35$ | | |
| | G1 | | | 5 | 1.51118 |
| spherical | | | $-1231.3$ | | |
| f$\theta$ | | | | 4 | |
| lens | G2 | | $-202.1$ | | |
| system | | | | 12 | 1.51118 |
| | | | $-56.07$ | | |
| | | | | 0.5 | |
| | | | 354.5 | | |
| | G3 | | | 18 | 1.51118 |
| | | | $-105.24$ | | |
| | | | | 265 | |

In the above composition, when temperature rises by 30° C. ($\Delta T = +30°$ C.), a variation $\Delta S_P'$ in the location of the final image point resulting from a change in the performance of the laser source unit 21 is $-7.2$ mm, and a variation $\Delta S_{T1}'$ in the location of the final image point resulting from a change in the focal length of the toroidal lens 38 is 7.0 mm. Consequently, an actual variation $\Delta S_{PC}$ in the location of the final image point when temperature rises by 30° C. is $-0.2$ mm.

Figure 13:
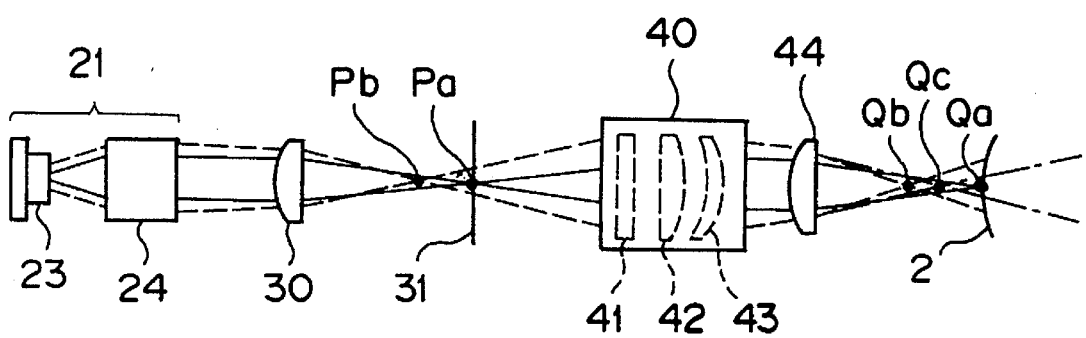
FIG. 13 is a view showing progression of the laser beam under a higher temperature with a correction according to a fifth embodiment.
Figure 14:
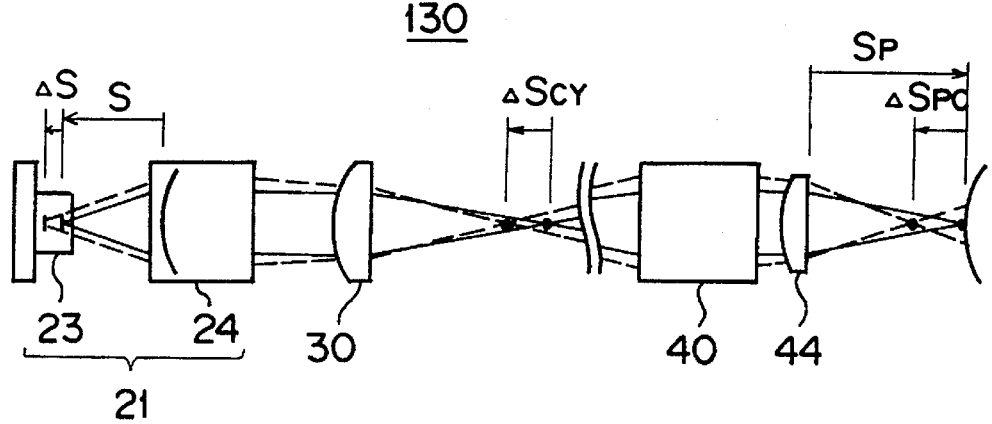
FIG. 14 is a view showing progression of the laser beam under a higher temperature with a correction according to the fifth embodiment.

Fifth Embodiment: See FIGS. 13 and 14

An optical scanning system 130 of a fifth embodiment has an f$\theta$ lens system 40 composed of a spherical concave lens 41, a toroidal lens 42 and a spherical convex lens 43, and a second cylindrical lens 44 disposed immediately before the photosensitive drum 2. The other components of the fifth embodiments are the same as those of the second embodiment shown in FIG. 7, and the fifth embodiment also has the plane mirror 33 although it is not shown in FIG. 13. The second cylindrical lens 44 is made of resin so that defocus caused by a change in the light converging performance of the laser source unit 21 with a change in temperature will be offset by a change in the performance of the second cylindrical lens 44. The first cylindrical lens 30 and the lenses of the f$\theta$ lens system 40 are made of glass.

With a rise in temperature, the laser source unit 21 changes its light converging performance, thereby moving the final image point from the regular point Qa to a point Qb. In the fifth embodiment, meanwhile, the focal length of the resin second cylindrical lens 44 becomes longer, thereby moving the image point from the point Qb to a point Qc which is closer to the regular point Qa. These changes in the fifth embodiment are basically the same as those in the third embodiment, and the expressions mentioned in the second and the third embodiments can be used in the fifth embodiment.

A variation $\Delta S$ in the distance S between the laser diode 23 and the collimator lens 24 with a change in temperature can be calculated by using the expression (1), and a variation $\Delta S_C'$ in the location of the mid image point caused by the variation $\Delta S$ can be calculated by using the expression (2). Then, a variation $\Delta S_P'$ in the location of the final image point caused by the variation $\Delta S_C'$ can be calculated by using the expression (2').

Next, a variation in the location of the final image point caused by a change in the focal length of the second cylindrical lens 44 with a change in temperature is examined. A change in the focal length of the lens 44 must be examined from two aspects, a change in its shape and a change in its refractive index. First, the focal length $f_{CY2}$ of the second cylindrical lens 44 can be expressed as follows.

$$f_{CY2} = r_{CY2}/(n_{CY2}-1) \qquad (101)$$

$r_{CY2}$: radius of curvature of the second cylindrical lens
$n_{CY2}$: refractive index of the second cylindrical lens A variation $\Delta f_{CY2}$ in the focal length of the second cylindrical lens 44 when its radius of curvature $r_{CY2}$ varies by $\Delta r_{CY2}$ can be calculated by using an expression (102).

$$\Delta f_{CY2} = r_{CY2}/(n_{CY2}-1) \qquad (102)$$

An expression (103) can be obtained from the expressions (101) and (102).

$$\Delta f_{CY2} = f_{CY2} \Delta r_{CY2}/r_{CY2} \qquad (103)$$

A variation $\Delta f_{CY2}$ in the focal length of the second cylindrical lens 44 when its refractive index $n_{CY2}$ varies by $\Delta n_{CY2}$ can be calculated by using an expression (104).

$$\Delta f_{CY2} = -r_{CY2} \Delta n_{CY2}(n_{CY2}-1)^2 \qquad (104)$$

An expression (105) can be obtained from the expressions (101) and (104).

$$\Delta f_{CY2} = -f_{CY2} \Delta n_{CY2}/(n_{CY2}-1) \qquad (105)$$

Consequently, a variation $\Delta f_{CY2}$ in the focal length of the second cylindrical lens 44 with a change in temperature is expressed as follows.

$$\Delta f_{CY2} = f_{CY2}[\Delta r_{CY2}/r_{CY2} - n_{sc\ CY2}/(n_{CY2}-1)] \qquad (106)$$

A variation $\Delta S_P$ in the location of the final image point caused by the variation $\Delta f_{CY2}$ in the focal length of the second cylindrical lens 44 can be calculated by using an expression (107).

$$\Delta S_P = \Delta f_{CY2}(S_P/f_{CY2})^2 \qquad (107)$$

$S_P$: distance between the second cylindrical lens and the photosensitive drum

Now a variation in the location of the final image point with a change in temperature is tried to be figured out, referring to an example having the following design values.

focal length of the collimator lens: $f_{CL}$=10 mm
distance between the laser diode and the collimator lens: S=8 mm
material of the holder: aluminum
coefficient of linear expansion of the holder: $k_S$ 23×10$^{-6}$/°C.
focal length of the first cylindrical lens: $f_{CY}$=150 mm
focal length of the second cylindrical lens: $f_{CY2}$=100 mm
material of the second cylindrical lens: acrylic resin
coefficient of linear expansion of the second cylindrical lens: $k_{CY2}$=70×10$^{-6}$/°C.
refractive index of the second cylindrical lens: $n_{CY2}$=1.483
coefficient of refractive index increase of the second cylindrical lens: $k_N$=−11×10$^{-5}$/°C.

distance between the second cylindrical lens and the photosensitive drum: $S_P$=90 mm
magnification of the fθ lens system in the sub-scanning direction: $\beta_f$=−1.5

A variation $\Delta S$ in the distance S when a variation $\Delta T$ in temperature is +30° C. is calculated at 0.0055 mm by using the expression (1). A variation $\Delta S_P'$ in the location of the final image point caused by the variation $\Delta S$ is calculated at −2.79 mm by using the expression (2').

If the second cylindrical lens 44 expands with heat symmetrically, a variation $\Delta r_{CY2}$ in its radius of curvature with a variation $\Delta T$ in temperature is calculated as follows.

$$\Delta r_{CY2} = r_{CY2} k_{CY2} \Delta T \qquad (108)$$

When $\Delta T$ is +30° C., $\Delta r_{CY2}/r_{CY2}$ is calculated at 0.0021 by using the expression (108).

A variation $\Delta n_{CY2}$ in the refractive index of the second cylindrical lens 44 with a change in temperature can be calculated by using an expression (109), and when temperature rises by 30° C., the variation $\Delta n_{CY2}$ is −0.0033.

$$\Delta n_{CY2} = k_N \Delta T \qquad (109)$$

By substituting these calculated values into the expressions (106) and (107), a variation $\Delta S_P$ in the location of the final image point caused by a change in the focal length of the second cylindrical lens 44 when temperature rises by 30° C. is calculated at 0.72 mm.

The variations $\Delta S_P'$ and $\Delta S_P$ are offset by each other, and an actual variation $\Delta S_{PC}$ in the location of the final image point can be expressed by $\Delta S_P' + \Delta S_P$. Accordingly, when temperature rises by 30° C., an actual variation $\Delta S_{PC}$ in the location of the final image point is −2.07 mm (−2.79+0.72).

If the optical scanning system 130 is made according to the above design values, defocus caused by a change in the performance of the laser source unit 21 with a change in temperature can be reduced by about 25%.

The adjusting (offsetting) effect of the second cylindrical lens 44 does not act upon the main-scanning. In other words, the second cylindrical lens 44 has such a small power in the main-scanning direction not as to be influenced by a change in temperature, and the second cylindrical lens 44 hardly influences the size of a beam spot in the main-scanning direction. However, a change in the distance S between the laser diode 23 and the collimator lens 24 does not influence the main-scanning, and therefore adjusting in the main-scanning direction is not necessary.

Next, conditions which inhibit influence of a change in temperature on the optical scanning system 130 are tried to be found out. Specifically, conditions which prevent the final image point from moving remarkably with a change in temperature are examined.

As is apparent from the above example, if defocus resulting from a change in the performance of the laser source unit 21 and defocus resulting from a change in the performance of the second cylindrical lens 44 are in the same degree, an actual variation $\Delta S_{PC}$ in the location of the final image point is very small. If the optical scanning system 130 is so made that $\Delta S_P$ (variation in the location of the final image point caused by a change in the focal length of the second cylindrical lens 44) is from −0.5 to −1.5 times $\Delta S_P'$ (variation in the location of the final image point caused by a change in the performance of the laser source unit 21), defocus with a change in temperature can be reduced to a half degree of that in a case of not using a resin second cylindrical lens.

The ratio K of $\Delta S_P$ to $\Delta S_P'$ can be expressed by an expression (111), based on the expressions (2'), (8) and (9).

$$K \approx \frac{f_{CY2}[\Delta r_{CY2}/r_{CY2} - \Delta n_{CY2}/(n_{CY2}-1)]}{-\Delta S \, (f_{CY}/f_{CL})^2 \, \beta_f^2} \times \left(\frac{S_P}{f_{CY2}}\right)^2 \quad (111)$$

Practically, thermal expansion of the second cylindrical lens 44 is very small, and $\Delta r_{CY2}$ is substantially 0. Accordingly, an expression (112) can be obtained.

$$K \approx \frac{f_{CY2} \Delta n_{CY2}/(n_{CY2}-1)}{\Delta S \, (f_{CY}/f_{CL})^2 \, \beta_f^2} \times \left(\frac{S_P}{f_{CY2}}\right)^2 \quad (112)$$

Further, an expression (113) can be obtained by substituting the expressions (1) and (11) into the expression (112).

$$K \approx \frac{f_{CL}^2 k_N f_{CY2}}{k_S f_{CY}^2 (n_{CY2}-1)} \times \left(\frac{S_P}{\beta_f f_{CY2}}\right)^2 \quad (113)$$

Since the distance S between the laser diode 23 and the collimator lens 24 is nearly equal to the focal length $f_{CL}$ of the collimator lens 24, an expression (114) is obtained.

$$K \approx \frac{f_{CL}}{k_S f_{CY}^2} \times \frac{k_N}{(n_{CY2}-1)} \times \frac{S_P^2}{\beta_f^2 f_{CY2}} \quad (114)$$

In the above example, a variation in the location of the final image point with a change in temperature is very small. Therefore conditions of proper focus adjustment are examined based on the design values used in the example.

When the above-mentioned design values are substituted into the expression (114), the ratio K is approximately 0.16. If the coefficient of refractive index increase $k_N$ and the refractive index $n_{CY2}$ of the second cylindrical lens 44 are the above-mentioned values ($-11\times10^{-5}$ and 1.483 respectively), the optical scanning system 130 should be so made as to meet a condition indicated by an expression (115).

$$K_1 \approx f_{CL} S_P/(k_S f_{CY}^2 f_{CY2} \beta_f^2) = 700 \quad (115)$$

If the coefficient of linear expansion $k_S$ of the holder 22 is the above-mentioned value ($23\times10^{-6}$), the collimator lens 24, the cylindrical lens 30 and the second cylindrical lens 44 should have focal lengths which meet a condition indicated by an expression (116).

$$K_2 \approx f_{CL} S_P/(f_{CY}^2 f_{CY2} \beta_f^2) = 0.016 \quad (116)$$

If the optical scanning system 130 is so made as to meet the conditions indicated by the expressions (114), (115) and (116), defocus caused by a change in the performance of the laser source unit 21 with a change in temperature can be reduced by 25%. If the optical scanning system 130 is so made that K, $K_1$ and $K_2$ are about 4 times the above-mentioned values (0.16, 700 and 0.016 respectively), defocus can be reduced by at least 50%. However, considering differences of susceptibility to a change in temperature among portions and aging of the second cylindrical lens 44, preferably the optical scanning system 130 is so made that a change in the performance of the cylindrical lens 44 with a change in temperature does not influence the performance of the optical scanning system 130 as a whole very much. Accordingly, the optical scanning system 130 is so made that the ratio K indicated by the expression (114) is at most 4 times the above-mentioned value (0.16). Meanwhile, in order to obtain the adjusting effect of the second cylindrical lens 44 sufficiently, preferably the optical scanning system 130 is so made that the ratio K is at least a half of the above-mentioned value (0.16).

Table 5 shows an exemplary composition of the fifth embodiment. In the composition, the focal length $f_{CL}$ of the collimator lens 24 is 5 mm, the distance S between the laser diode 23 and the collimator lens 24 is 4 mm, and the magnification $\beta_f$ of the fθ lens system in the sub-scanning direction is −2.3. The focal length $f_{CY}$ of the first cylindrical lens 30 is 40 mm, the focal length $f_{CY2}$ of the second cylindrical lens 4 is 133 mm, and the distance $S_P$ between the second cylindrical lens 44 and the photosensitive drum 2 is 114 mm.

TABLE 5

| | | radius of curvature (mm) | | | |
|---|---|---|---|---|---|
| | | direction parallel with plane of deflection | direction perpendicular to plane of deflection | distance (mm) | refractive index |
| first cylindrical lens | | ∞ | 20.47 | | |
| | | | ∞ (plane side) | 5 | 1.51117 |
| polygonal mirror | | | | 37.2 | |
| | | ∞ | ∞ (plane side) | | |
| | | | | 16 | |
| | spherical concave lens | −400 (spherical side) | | | |
| | | | | 6 | 1.51117 |
| | | 600 | | | |
| fθ lens system | | | | 26 | |
| | toroidal lens | −45 | ∞ | | |
| | | | | 6 | 1.51117 |
| | | −51 | −38.3 | | |
| | | | | 1 | |
| | spherical convex lens | −660 (spherical side) | | | |
| | | | | 12.7 | 1.78571 |
| | | −94.1 (spherical side) | | | |
| | | | | 100 | |
| second cylindrical lens | | ∞ | 64.2 | | |
| | | | ∞ (plane side) | 5 | 1.483 |
| | | | | 114 | |

In the composition, a variation $\Delta S_P'$ in the location of the final image point caused by a change in the performance of the laser source unit 21 when temperature rises by 30° C. ($\Delta T=+30°$ C.) is −1.0 mm, and a variation $\Delta S_P$ in the location of the final image point caused by a change in the focal length of the second cylindrical lens 44 with the change in temperature ($\Delta T=+30°$ C.) is 0.9 mm. Consequently, an actual variation $\Delta S_{PC}$ in the location of the final image point when temperature rises by 30° C. is 0.1 mm.

Figure 15:
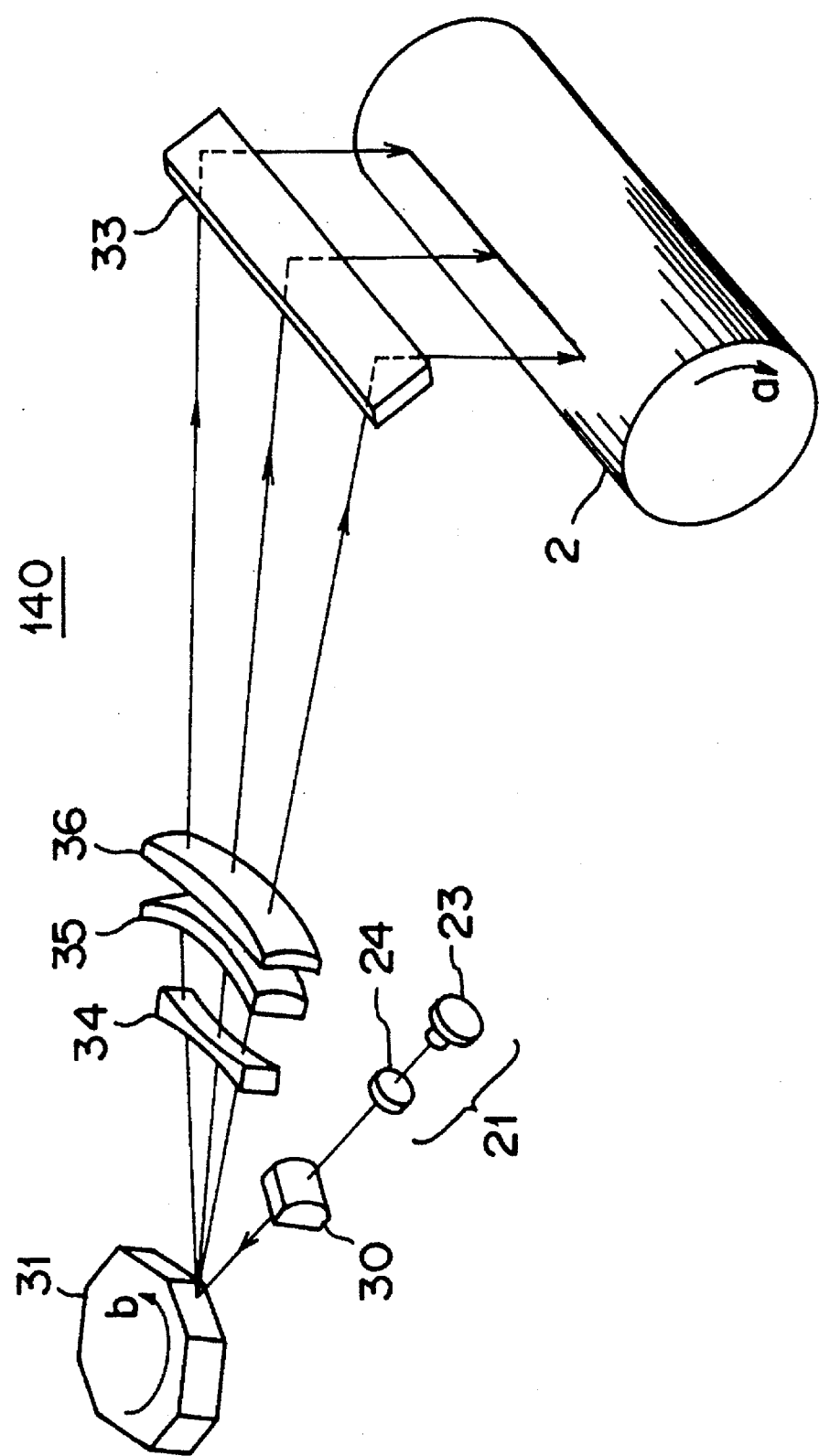
FIG. 15 is a perspective view of a laser beam optical scanning system of a sixth embodiment.
Figure 16:
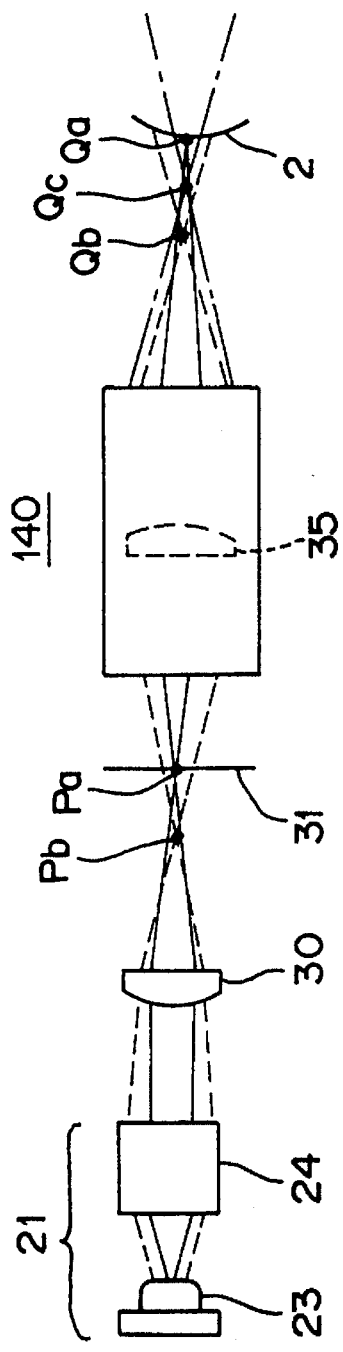
FIG. 16 is a view showing progression of the laser beam under a higher temperature with a correction according to the sixth embodiment.
Figure 17:
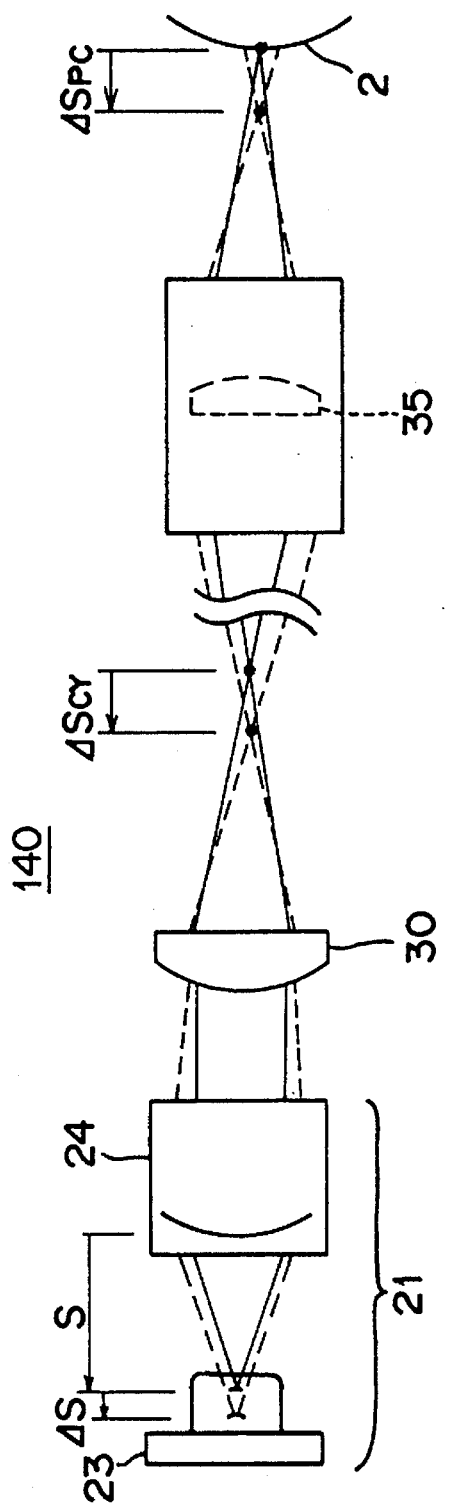
FIG. 17 is a view showing progression of the laser beam under a higher temperature with a correction according to the sixth embodiment.

Sixth Embodiment: See FIGS. 15–17

Figure 7:
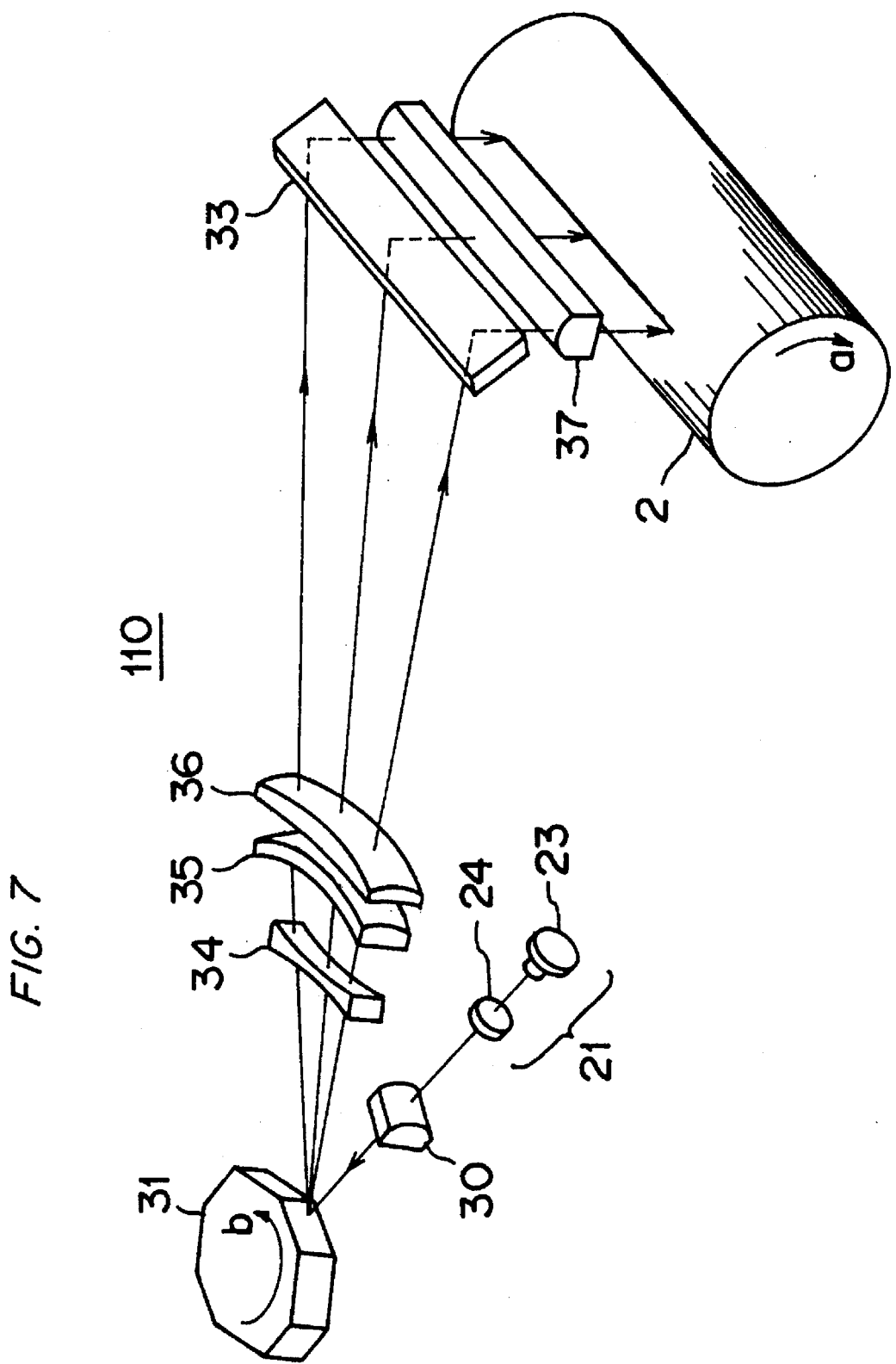
FIG. 7 is a perspective view of a laser beam optical scanning system of a second embodiment.

An optical scanning system 140 of a sixth embodiment has basically the same structure as the first embodiment shown in FIG. 7. The sixth embodiment has an fθ lens system composed of the spherical concave lens 34, the toroidal lens 35 having a toric surface, and the spherical convex lens 36. However, the sixth embodiment does not have the second cylindrical lens 37, and the first cylindrical lens 30 is made of glass. The toroidal lens 35 is made of resin so that defocus caused by a change in the light converging performance of the laser source unit 21 will be offset by a change in performance of the resin toroidal lens 35.

As described in connection with the first and the second embodiments, the distance S between the laser diode 23 and the collimator lens 24 is lengthened with a rise in temperature, thereby moving the final image point from the regular point Qa to a point Qb. In the sixth embodiment, meanwhile, the focal length of the resin toroidal lens 35 becomes longer, thereby moving the final image point from the point Qb to a point Qc which is closer to the regular point Qa.

A change in the focal length of the toroidal lens 35 with a change in temperature must be examined from two aspects, a change in its shape and a change in its refractive index. Its mathematical analysis is basically the same as that in the second embodiment, and the expressions (33) through (38) and (41) through (48) can be used in the sixth embodiment.

Now a variation in the location of the final image point with a change in temperature is tried to be figured out, referring to an example having the following design values.

focal length of the collimator lens: $f_{CL}=8$ mm distance between the laser diode and the collimator lens: $S=8$ mm material of the holder: aluminum coefficient of linear expansion of the holder: $k_S=23\times10^{-6}/°C$.

focal length of the cylindrical lens: $f_{CY}=58$ mm focal length of the toroidal lens: $f_T=50$ mm material of the toroidal lens: acrylic resin coefficient of linear expansion of the toroidal lens: $k_T=70\times10^{-6}/°C$.

refractive index of the toroidal lens: $n_T=1.483$ coefficient of refractive index increase of the toroidal lens: $k_N=-11\times10^{-5}/°C$.

magnification of the fθ lens system in the sub-scanning direction: $\beta_f=-4$

A variation $\Delta S$ in the distance S when a variation $\Delta T$ in temperature is +30° C. is calculated at 0.0055 mm by using the expression (1). A variation $\Delta S_P'$ in the location of the final image point caused by the variation $\Delta S$ is calculated at −4.64 mm by using the expression (2').

If the toroidal lens 35 expands with heat symmetrically, a variation $\Delta r_T$ in its radius of curvature with a variation $\Delta T$ in temperature can be calculated by using the expression (2), and when $\Delta T$ is +30° C., $\Delta r_T/r_T$ is calculated at 0.0021.

A variation $\Delta n_T$ in the refractive index of the toroidal lens 35 with the rise in temperature ($\Delta T=+30°$ C.) is calculated at −0.0033 by using the expression (52).

A variation $\Delta S_{T1}'$ in the location of the final image point caused by a change in the focal length of the toroidal lens 35 with the change in temperature ($\Delta T=+30°$ C.) is calculated at 4.57 mm by substituting the calculated values into the expressions (38) and (48).

The variations $\Delta S_P'$ and $\Delta S_{T1}'$ are offset by each other, and an actual variation $\Delta S_{PC}$ in the location of the final image point can be expressed by $\Delta S_P'+\Delta S_{T1}'$. Accordingly, an actual variation $\Delta S_{PC}$ in the location of the final image point when temperature rises by 30° C. is −0.07 mm (−4.64+4.57).

If the optical scanning system 140 is made according to the above design values, defocus with a change in temperature can be inhibited to a very low degree.

Further, the adjusting (offsetting) effect of the toroidal lens 35 does not act upon the main-scanning. In other words, the toroidal lens 35 has such a small power in the main-scanning direction as not to be influenced by a change in temperature, and the toroidal lens 35 hardly influences the size of a beam spot in the main-scanning direction. However, a change in the distance S between the laser diode 23 and the collimator lens 24 does not influence the main-scanning, and therefore adjusting in the main-scanning direction is not necessary.

Next, conditions which inhibit influence of a change in temperature on the optical scanning system 140 are tried to be found out.

As is apparent from the above example, if defocus caused by a change in the performance of the laser source unit 21 and defocus caused by a change in the performance of the toroidal lens 35 are in the same degree, an actual variation $\Delta S_{PC}$ in the location of the final image point is very small. If the optical scanning system 120 is so made that $\Delta S_{T1}'$ (variation in the location of the final image point caused by a change in the focal length of the toroidal 35) is from −0.5 to −1.5 times $\Delta S_P'$ (variation in the location of the final image point caused by a change in the performance of the laser source unit 21), defocus with a change in temperature can be reduced to a half degree of that in a case of not using a resin toroidal lens.

The ratio K of $\Delta S_{T1}'$ to $\Delta S_P'$ can be expressed by an expression (121), based on the expressions (2'), (8) and (9).

$$K \approx \frac{f_T[\Delta r_T/r_T - \Delta n_T/(n_T-1)](S_T/f_T)^2}{-\Delta S(f_{CY}/f_{CL})^2} \quad (121)$$

Practically, thermal expansion of the toroidal lens 35 is very small, and $\Delta r_T$ is substantially 0. Accordingly, an expression (122) can be obtained.

$$K \approx \frac{S_T^2 \Delta n_T/(n_T-1) f_T}{\Delta S(f_{CY}/f_{CL})^2} \quad (122)$$

Further, an expression (123) can be obtained by substituting the expressions (1) and (11) into the expression (122).

$$K \approx \frac{f_{CL}^2 k_N}{k_S S f_{CY}^2 (n_{CY}-1)} \times \frac{S_T^2}{f_T} \quad (123)$$

Since the distance S between the laser diode 23 and the collimator lens 24 is nearly equal to the focal length $f_{CL}$ of the cylindrical lens 30, an expression (124) is obtained.

$$K \approx \frac{f_{CL}}{k_S f_{CY}^2} \times \frac{k_N}{(n_{CY}-1)} \times \frac{S_T^2}{f_T} \quad (124)$$

In the above example, a variation in the location of the final image point with a change in temperature is very small. Therefore conditions of proper focus adjustment are examined based on the design values used in the example.

When the above design values are substituted into the expression (124), the ratio K is approximately 0.75. If the coefficient of refractive index increase $k_N$ and the refractive index $n_T$ of the toroidal lens 35 are the above-mentioned values (−11×10⁻⁵ and 1.483 respectively), the optical scanning system 140 should be so made as to meet a condition indicated by an expression (125).

$$K_1 = f_{CL} S_T^2/k_S f_{CY}^2 f_T = 3300 \quad (125)$$

If the coefficient of linear expansion $k_S$ of the holder 22 is the above-mentioned value (23×10⁻⁶), the collimator lens 24, the cylindrical lens 30 and the toroidal lens 35 must have focal lengths which meet a condition indicated by an expression (126).

$$K_2 = f_{CL} S_T^2/f_{CY}^2 f_T = 0.076 \quad (126)$$

If the optical scanning system 140 is so made as to meet the conditions indicated by the expressions (124); (125) and (126), defocus caused by a change in the performance of the laser source unit 21 with a change in temperature can be properly corrected. As long as the optical scanning system 140 is so made that K, $K_1$ and $K_2$ are from 0.5 to 1.5 times the above-mentioned values (0.75, 3300 and 0.076 respectively), defocus resulting from a change in the performance of the laser source unit 21 with a change in temperature can be reduced by at least 50%.

Table 6 shows an exemplary composition of the sixth embodiment. In the composition, the focal length $f_{CY}$ of the cylindrical lens 30 is 60 mm, the distance $S_T$ between the toroidal lens 35 and the polygonal mirror 31 is −45 mm, and the magnification $\beta_f$ of the fθ lens system in the sub-scanning direction is −4.25.

TABLE 6

| | radius of curvature (mm) | | | |
|---|---|---|---|---|
| | direction parallel with plane of deflection | direction perpendicular to plane of deflection | distance (mm) | refractive index |
| cylindrical lens | ∞ | 30.67 | 5 | 1.51117 |
| | ∞ (plane side) | | 57.6 | |
| polygonal mirror | ∞ (plane side) | | 14.5 | |
| fθ lens system | spherical concave lens | −600 (spherical side) 1220.2 | 5 21.5 | 1.51117 |
| | toroidal lens | −50 −56.5 | ∞ −24.15 | 6.5 0.5 | 1.483 |
| | spherical convex lens | −853 (spherical side) −91.32 (spherical side) | 12 200 | 1.78571 |

In the composition, a variation $\Delta S_P'$ in the location of the final image point resulting from a change in the performance of the laser source unit 21 when temperature rises by 30° C. ($\Delta T=+30°$ C.) is −5.6 mm. A variation $\Delta S_{T1}'$ in the location of the final image point resulting from a change in the focal length of the toroidal lens 35 with the rise in temperature ($\Delta T=+30°$ C.) is 5.4 mm. Consequently, an actual variation $\Delta S_{PC}$ in the location of the final image point with the rise in temperature is −0.2 mm.

Figure 18:
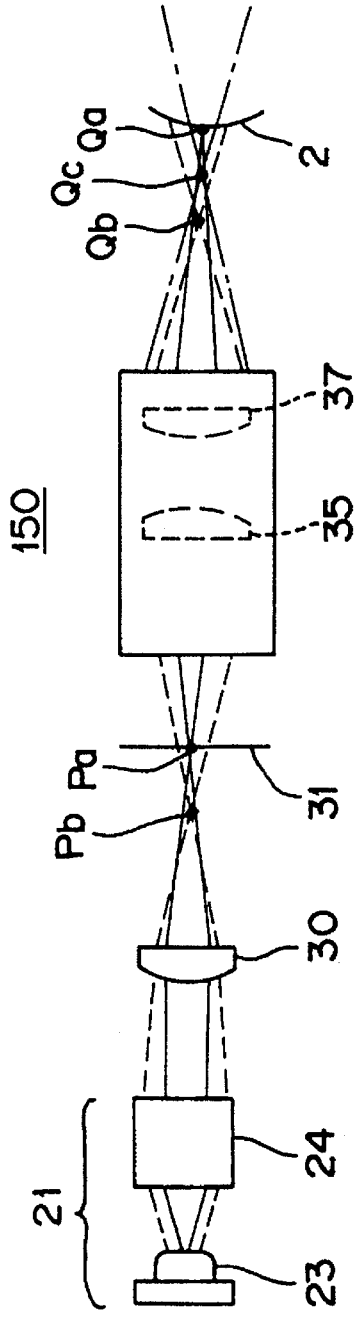
FIG. 18 is a view showing progression of the laser beam under a higher temperature with a correction according to a seventh embodiment.
Figure 19:
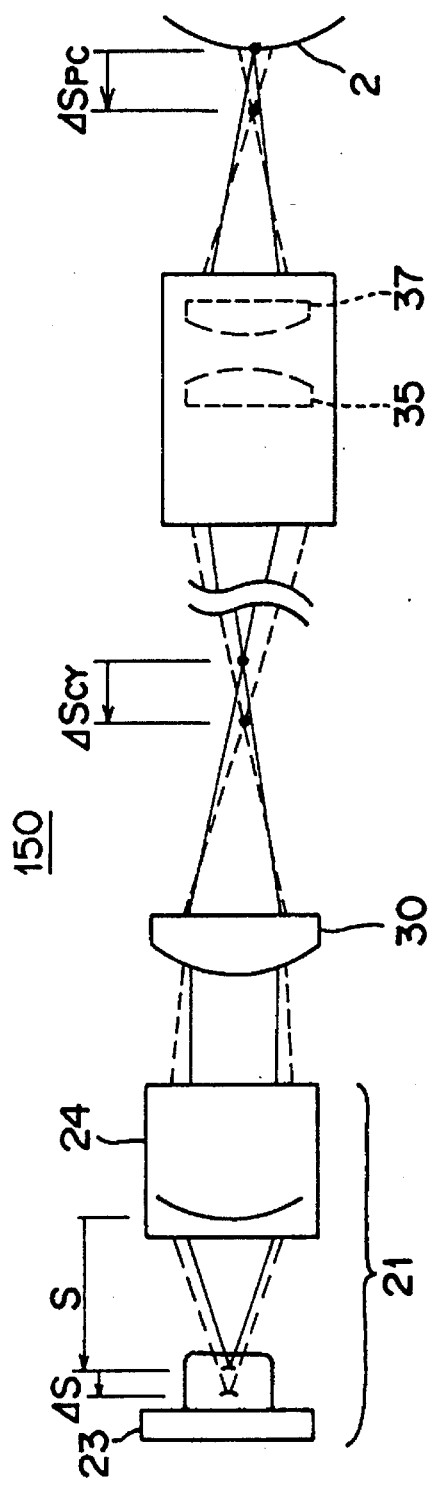
FIG. 19 is a view showing progression of the laser beam under a higher temperature with a correction according to the seventh embodiment.

Seventh Embodiment: See FIGS. 18 and 19

An optical scanning system 150 of a seventh embodiment has the second cylindrical lens 37, and the other components are the same as those of the sixth embodiment. In the seventh embodiment, the toroidal lens 35 is made of resin so that defocus caused by a change in the performance of the laser source unit 21 will be offset by a change in performance of the resin toroidal lens 35. The first cylindrical lens 30 and the second cylindrical lens 37 are made of glass.

With a rise in temperature, the laser source unit 21 changes its light converging performance, thereby moving the final image point from the regular point Qa to a point Qb. In the seventh embodiment, meanwhile, the focal length of the resin toroidal lens 35 becomes longer, thereby moving the image point from the point Qb to a point Qc which is closer to the regular point Qa.

These changes are hereinafter analyzed using expressions. The expressions mentioned in the second and the sixth embodiments can be used for the analysis.

Now a variation in the location of the final image point with a change in temperature is tried to be figured out, referring to an example having the following design values.

focal length of the collimator lens: $f_{CL}=10$ mm distance between the laser diode and the collimator lens: S=8 mm material of the holder: aluminum coefficient of linear expansion of the holder: $k_S=23\times10^{-6}/°C$.

focal length of the first cylindrical lens: $f_{CY}=150$ mm focal length of the toroidal lens: $f_T=75$ mm material of the toroidal lens: acrylic resin coefficient of linear expansion of the toroidal lens: $k_T=70\times10^{-6}/°C$.

refractive index of the toroidal lens: $n_T=1.483$ coefficient of refractive index increase of the toroidal lens: $k_N=-11\times10^{-5}/°C$.

magnification of the fθ lens system in the sub-scanning direction: $\beta_f=-1.5$ A variation $\Delta S$ in the distance S when temperature rises by 30° C. ($\Delta T=+30°$ C.) is calculated at 0.0055 mm by using the expression (1). A variation $\Delta S_P'$ in the location of the final image point resulting from the variation $\Delta S$ is calculated at −2.79 mm by using the expression (2').

If the toroidal lens 35 expands with heat symmetrically, a variation $\Delta r_T$ in its radius of curvature with a change in temperature can be calculated by using the expression (51). Accordingly, when $\Delta T$ is +30° C., $\Delta r_T/r_T$ is −0.0033. A variation $\Delta n_T$ in its refractive index with a change in temperature can be calculated by using the expression (52), and in this case, it is calculated at −0.0033.

A variation $\Delta S_{T1}'$ in the location of the final image point resulting from a change in the focal length of the toroidal lens 35 with the change in temperature ($\Delta T=+30°$ C.) is calculated at 1.13 mm by substituting the calculated values into the expressions (38) and (48).

The variations $\Delta S_P'$ and $\Delta S_{T1}'$ are offset by each other, and an actual variation $\Delta S_{PC}$ in the location of the final image point is expressed by $\Delta S_P'+\Delta S_{T1}'$. When temperature rises by 30° C., an actual variation $\Delta S_{PC}$ in the location of the final image point is −1.66 mm (−2.79+1.13).

If the optical scanning system 150 is made according to the above design values, defocus caused by a change in the performance of the laser source unit 21 with a change in temperature can be reduced by about 40%.

Further, the adjusting (offsetting) effect of the toroidal lens 35 does not act on the main-scanning. In other words, the toroidal lens 35 has such a small power in the main-scanning as not to be influenced by a change in temperature, and the toroidal lens 35 hardly influences the size of a beam spot in the main-scanning. However, a change in the distance S between the laser diode 23 and the collimator lens 24 does not influence the main-scanning, and therefore adjusting in the main-scanning direction is not necessary.

Next, conditions which inhibit influence of a change in temperature on the optical scanning system 150 are tried to be found out. The expressions (121), (122), (123) and (124) mentioned in the sixth embodiment can be used in the seventh embodiment.

In the above example, a variation in the location of the final image point with a change in temperature is very small. Therefore conditions of proper focus adjustment are examined based on the design values used in the example.

When the values are substituted into the expression (124), the ratio K is approximately 0.61. If the coefficient of refractive index increase $k_N$ and the refractive index $n_T$ of the toroidal lens 35 are the above-mentioned values ($-11\times10^{-5}$ and 1.483 respectively), the ratio $K_1$ indicated by the expression (125) should be considered. In the seventh embodiment, a condition of proper adjustment is $K_1 \approx 2690$.

Further, if the coefficient of linear expansion of the holder 22 is the above-mentioned value ($23\times10^{-6}$), the ratio $K_2$ indicated by the expression (126) should be considered. In the seventh embodiment, a condition of proper adjustment is $K_2 \approx 0.062$.

If the optical scanning system 150 is so made as to meet the conditions, $K \approx 0.61$, $K_1 \approx 2690$ and $K_2 \approx 0.062$, defocus caused by a change in temperature can be properly corrected. As long as the optical scanning system 150 is so made that K, $K_1$ and $K_2$ are from 0.2 to 1.8 times the above values, defocus resulting from a change in the performance of the laser source unit 21 can be reduced by at least 20%. Specifically concerning $K_2$, as long as the optical scanning system 150 meets a condition, $0.012 < K_2 < 0.11$, the defocus is reduced by at least 20%.

Table 7 shows an exemplary composition of the seventh embodiment. In the composition, the focal length $f_{CL}$ of the collimator lens is 5 mm, the distance S between the laser diode 23 and the collimator lens 24 is 4 mm, and the magnification $\beta_f$ of the fθ lens system in the sub-scanning direction is $-3.1$. The focal length $f_{CY}$ of the first cylindrical lens 30 is 50 mm, the focal length $f_T$ of the toroidal lens 35 is 74.5 mm, and the distance $S_T$ between the toroidal lens 35 and the polygonal mirror 31 is $-48$ mm.

TABLE 7

| | radius of curvature (mm) | | | |
|---|---|---|---|---|
| | direction parallel with plane of deflection | direction perpendicular to plane of deflection | distance (mm) | refractive index |
| first cylindrical lens | ∞ | 25.56 | 5 | 1.51117 |
| | ∞ (plane side) | | 47.2 | |
| polygonal mirror | ∞ (plane side) | | 16 | |
| spherical concave lens | −400 (spherical side) | | 6 | 1.51117 |
| | 600 | | 26 | |
| fθ lens system toroidal lens | −48 | ∞ | 6 | 1.483 |
| | −54 | −36 | 1 | |
| spherical convex lens | −660 (spherical side) | | 12.7 | 1.78571 |
| | −94.1 (spherical side) | | 50 | |
| second cylindrical lens | ∞ | 100 | 5 | 1.51117 |
| | ∞ (plane side) | | 159.5 | |

In the composition, a variation $\Delta S_P'$ in the location of the final image point resulting from a change in the performance of the laser source unit 21 when temperature rises by 30° C. ($\Delta T = +30$) is $-2.7$ mm, and a variation $\Delta S_{T1}'$ in the location of the final image point resulting from a change in the focal length of the toroidal lens 35 with the change in temperature ($\Delta T = +30$) is 2.8 mm. Consequently, an actual variation $\Delta S_{PC}$ in the location of the final image point at that time is 0.1 mm.

Figure 20:
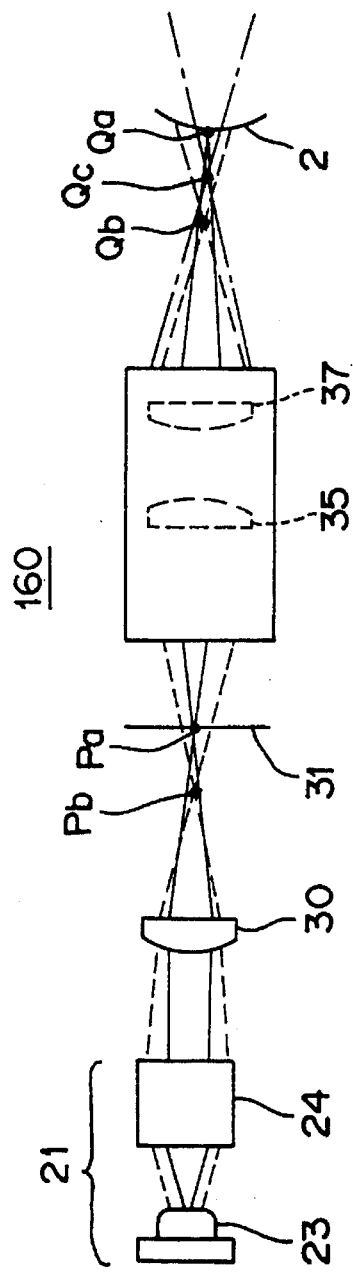
FIG. 20 is a view showing progression of the laser beam under a higher temperature with a correction according to an eighth embodiment.
Figure 21:
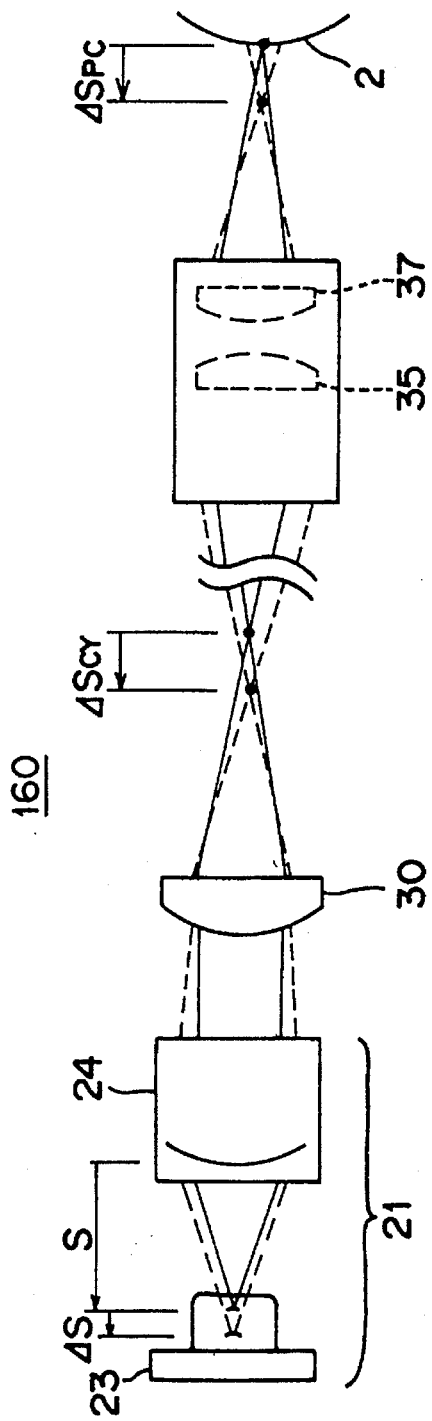
FIG. 21 is a view showing progression of the laser beam under a higher temperature with a correction according to the eighth embodiment.

Eighth Embodiment: See FIGS. 20 and 21

An optical scanning system 160 of an eighth embodiment has the fθ lens system composed of the spherical concave lens 34, the toroidal lens 35 having a toric surface, the spherical convex lens 36 and the second cylindrical lens 37 disposed between the plane mirror 33 and the photosensitive drum 2. In the eighth embodiment, the toroidal lens 35 and the second cylindrical lens 37 are made of resin so that defocus caused by a change in the performance of the laser source unit 21 will be offset by a change in performance of the resin toroidal lens 35 and a change in performance of the resin second cylindrical lens 37. In these points, the eighth embodiment is the same as the second embodiment.

With a rise in temperature, the laser source unit 21 changes its light converging performance, thereby moving the final image point from the regular point Qa to a point Qb. In the eighth embodiment, meanwhile, the focal length of the resin second cylindrical lens 44 becomes longer, thereby moving the image point from the point Qb to a point Qc which is closer to the regular point Qa.

The expressions mentioned in the second embodiment can be used for mathematical analysis of the eighth embodiment.

Now a variation in the location of the final image point with a change in temperature is tried to be figured out, referring to an example having the following design values.

focal length of the collimator lens: $f_{CL} = 10$ mm distance between the laser diode and the collimator lens: $S = 8$ mm material of the holder: aluminum coefficient of linear expansion of the holder: $k_S = 23 \times 10^{-6}$/°C.

focal length of the first cylindrical lens: $f_{CY} = 150$ mm focal length of the toroidal lens: $f_T = 75$ mm material of the toroidal lens: acrylic resin coefficient of linear expansion of the toroidal lens: $k_T = 70 \times 10^{-6}$/°C.

refractive index of the toroidal lens: $n_T = 1.483$ coefficient of refractive index increase of the toroidal lens: $k_N = -11 \times 10^{-5}$/°C.

focal length of the second cylindrical lens: $f_{CY2} = 100$ mm material of the second cylindrical lens: acrylic resin coefficient of linear expansion of the second cylindrical lens: $k_{CY2} = 70 \times 10^{-6}$/°C.

refractive index of the second cylindrical lens: $n_{CY2} = 1.483$ coefficient of refractive index increase of the second cylindrical lens: $k_N = -11 \times 10^{-5}$/°C.

distance between the toroidal lens and the polygonal mirror: $S_T = -65$ mm distance between the second cylindrical lens and the photosensitive drum: $S_P = 90$ mm magnification of the fθ lens system in the sub-scanning direction: $\beta_f = -1.5$ A variation $\Delta S$ in the distance S when a variation $\Delta T$ in temperature is +30° C. is calculated at 0.0055 mm by using the expression (1). A variation $\Delta S_P'$ in the location of the final image point resulting from the variation $\Delta S$ is calculated at $-2.79$ mm by using the expression (2').

If the toroidal lens 35 expands with heat symmetrically, a variation $\Delta r_T$ in its radius of curvature with a variation $\Delta T$ in temperature can be calculated by using the expression (51). When $\Delta T$ is +30° C., $\Delta r_T/r_T$ is 0.0021.

A variation $\Delta n_T$ in the refractive index of the toroidal lens 35 with a variation $\Delta T$ in temperature can be calculated by using the expression (52), and when $\Delta T$ is +30° C., the variation $\Delta n_T$ is $-0.0033$.

By substituting the calculated values into the expressions (38) and (48), a variation $\Delta S_{T1}'$ in the location of the final image point resulting from a change in the focal length of the toroidal lens 35 with the rise in temperature (ΔT=+30° C.) is calculated at 1.13 mm.

A variation $\Delta S_P$ in the location of the final image point resulting from a change in the focal length of the second cylindrical lens 37 with the rise in temperature (ΔT=+30° C.) can be figured out in the same manner as the variation $\Delta S_{T1}'$. Specifically, the radius of curvature $r_{CY2}$ of the second cylindrical lens 37 and its variation $\Delta r_{CY2}$ with the rise in temperature (ΔT=+30° C.) can be calculated by using the expression (53), and $\Delta r_{CY2}/r_{CY2}$ is 0.0021. A variation $\Delta n_{CY2}$ in its refractive index with the rise in temperature (ΔT=+30° C.) is calculated at −0.0033 by using the expression (52).

By substituting the calculated values into the expressions (49) and (50), a variation $\Delta S_P$ in the location of the final image point resulting from a change in the focal length of the second cylindrical lens 37 is calculated at 0.72 mm.

The variations $\Delta S_P'$, $\Delta S_{T1}'$ and $\Delta S_P$ are offset by one another, and an actual variation $\Delta S_{PC}$ in the location of the final image point can be expressed by $\Delta S_P' + \Delta S_{T1}' + \Delta S_P$. An actual variation $\Delta S_{PC}$ in the location of the final image point when temperature rises by 30° C. is −0.94 mm (−2.79+1.13+0.72).

If the optical scanning system 160 is made according to the above design values, defocus with a change in temperature can be inhibited to a low degree (about one third of that caused by a change in the performance of the laser source unit 21).

Further, the adjusting (offsetting) effect of the fθ lens system does not act upon the main-scanning. In other words, the fθ lens system has such a small power in the main-scanning direction as not to be influenced by a change in temperature, and the fθ lens system hardly influences the size of a beam spot in the main-scanning direction. However, a change in the distance S between the laser diode 23 and the collimator lens 24 does not influence the main-scanning, and therefore adjusting in the main-scanning direction is not necessary.

Next, conditions which inhibit influence of a change in temperature on the optical scanning system 160 are tried to be found out.

As is apparent from the above example, if defocus caused by a change in the performance of the laser source unit 21 and defocus caused by changes in the focal lengths of the toroidal lens 35 and the second cylindrical lens 37 are in the same degree, an actual variation $\Delta S_{PC}$ in the location of the final image point is very small. As long as the optical scanning system 160 is so made that $\Delta S_{T1}' + \Delta S_P$ (total variation in the location of the final image point caused by changes in the focal lengths of the toroidal 35 and the second cylindrical lens 37) is from −0.5 to −1.5 times $\Delta S_P'$ (variation in the location of the final image point caused by a change in the performance of the laser source unit 21) caused by a change in the performance of the laser source unit 21, defocus with a change in temperature can be reduced to a half degree of that in a case of not using a resin toroidal lens and a resin second cylindrical lens.

The ratio K of $\Delta S_{T1}' + \Delta S_P$ to $\Delta S_P'$ can be expressed by an expression (131), based on the expressions (2), (8) and (9).

$$K \approx \frac{f_T[\Delta r_T/r_T - \Delta n_T/(n_T-1)](S_T/f_T)^2}{-\Delta S (f_{CY}/f_{CL})^2} + \frac{f_{CY2}[\Delta r_{CY2}/r_{CY2} - \Delta n_{CY2}/(n_{CY2}-1)](S_P/f_{CY2})^2}{-\Delta S (f_{CY}/f_{CL})^2 \beta_f^2} \quad (131)$$

Practically, thermal expansion of the toroidal lens 35 and the second cylindrical lens 37 is very small, and $\Delta r_T$ and $\Delta r_{CY2}$ are substantially 0. An expression (132) can be obtained by substituting the expressions (1) and (52), and $n_{CY2}=n_T$ into the expression (131).

$$K \approx \frac{f_{CL}^2 k_N}{k_S S f_{CY}^2 (n_T - 1)} \times \left( \frac{S_T^2}{f_T} + \frac{S_P^2}{f_{CY2} \beta_f^2} \right) \quad (132)$$

Since the distance S is nearly equal to the focal length $f_{CL}$ of the collimator lens 24, an expression (133) can be obtained.

$$K \approx \frac{f_{CL}}{k_S f_{CY}^2} \times \frac{k_N}{(n_T - 1)} \times \left( \frac{S_T^2}{f_T} + \frac{S_P^2}{f_{CY2} \beta_f^2} \right) \quad (133)$$

In the above example, a variation in the location of the final image point with a change in temperature is very small. Therefore conditions of proper focus adjustment are examined based on the design values used in the example.

When the above values are substituted into the expression (133), the ratio K is approximately 0.62. If the coefficient of refractive index increase $k_N$ and the refractive index $n_T$ of the toroidal lens 35 are the above-mentioned values (−11× $10^{-5}$ and 1.483 respectively), the optical scanning system 160 should be so made as to meet a condition indicated by an expression (134).

$$K_1 \approx \frac{f_{CL}}{k_S S f_{CY}^2} \times \left( \frac{S_T^2}{f_T} + \frac{S_P^2}{f_{CY2} \beta_f^2} \right) = 2740 \quad (134)$$

Further, if the coefficient of linear expansion $k_S$ of the holder 22 is the above-mentioned value (23×10$^{-6}$/°C.), the optical scanning system 160 should be so made as to meet a condition indicated by an expression (135).

$$K_2 \approx \frac{f_{CL}}{f_{CY}^2} \times \left( \frac{S_T^2}{f_T} + \frac{S_P^2}{f_{CY2} \beta_f^2} \right) = 0.063 \quad (135)$$

If the optical scanning system 160 is so made as to meet the conditions indicated by the expressions (133), (134) and (135), defocus caused by a change in the performance of the laser source unit 21 with a change in temperature can be properly corrected. As long as the optical scanning system 160 is so made that K, $K_1$ and $K_2$ are from 0.3 to 1.3 times the above-mentioned values (0.62, 2740 and 0.063 respectively), defocus caused by a change in the performance of the laser source unit 21 with a change in temperature can be reduced by at least 30%. Concerning $K_2$, as long as the optical scanning system 160 meets a condition, $0.02<K_2<0.11$, the defocus can be reduced by at least 30%.

Table 8 shows an exemplary composition of the eighth embodiment. In this composition, the focal length $f_{CY}$ of the first cylindrical lens 30 is 130 mm, and the focal length $f_T$ of the toroidal lens 35 is 124 mm. The distance $S_T$ between the toroidal lens 35 and the polygonal mirror 31 is −72 mm, and the distance $S_P$ between the second cylindrical lens 37 and the photosensitive drum 2 is 95 mm. The magnification $\beta_f$ of the fθ lens system in the sub-scanning direction is −1.2.

TABLE 8

| | radius of curvature (mm) | | | |
|---|---|---|---|---|
| | direction parallel with plane of deflection | direction perpendicular to plane of deflection | distance (mm) | refractive index |
| first cylindrical | ∞ | 66.45 | 5 | 1.51117 |

TABLE 8-continued

| | | radius of curvature (mm) | | | |
|---|---|---|---|---|---|
| | | direction parallel with plane of deflection | direction perpendicular to plane of deflection | distance (mm) | refractive index |
| lens | | ∞ (plane side) | | | |
| | | | | 127.6 | |
| polygonal mirror | | ∞ (plane side) | | | |
| | | | | 24 | |
| | spherical concave lens | −600 (spherical side) 900 | | 9 | 1.51117 |
| | | | | 39 | |
| fθ lens system | toroidal lens | −55 −64 | ∞ −60 | 9 1.5 | 1.483 |
| | spherical convex lens | −990 (spherical side) −141 (spherical side) | | 19 | 1.78571 |
| | | | | 250 | |
| | second cylindrical lens | ∞ ∞ (plane side) | 48.3 | 5 95 | 1.483 |

In the composition, a variation $\Delta S_P{'}$ in the location of the final image point caused by a change in the performance of the laser source unit 21 when temperature rises by 30° C. ($\Delta T=+30°$ C.) is −1.3 mm, and a total variation $\Delta S_{T1}{'}+\Delta S_P$ caused by changes in the focal lengths of the toroidal lens 35 and the second cylindrical lens 37 with the rise in temperature ($\Delta T=+30°$ C.) is 1.3 mm. Consequently, an actual variation a $\Delta S_{PC}$ in the location of the final image point at that time is 0 mm.

Other Embodiments

Although the present invention has been described in connection with the preferred embodiments above, it is to be noted that various changes and modifications are possible to those who are skilled in the art. Such changes and modifications are to be understood as being within the scope of the present invention.

In the above embodiments, lenses which have strong powers in the main-scanning direction are made of glass so that the lenses will not change their performances according to temperature. However, these lenses can be replaced by mirrors, and in that case, the mirrors can be made of resin because resin mirrors hardly change their performance according to temperature.

The laser source unit 21 is a type wherein the collimator lens 24 is fixed, but the laser diode 23 instead of the collimator lens 24 may be fixed.

Although the polygonal mirror is used as a deflector in the above embodiments, a galvano mirror may be used.

Further, the diffused light radiated from the laser diode 23 does not have to be changed into a parallel pencil of rays by using the collimator lens, and it may be changed into a convergent pencil of rays or a divergent pencil of rays by using a convergent lens.

What is claimed is:

1. A laser beam optical scanning system which deflects a laser beam modulated in accordance with image data by using a deflector to scan the laser beam on a scanning surface, the laser beam optical scanning system comprising:

a laser source unit which converges a laser beam to emit a substantially parallel pencil of rays, the laser source unit changing the convergence of the laser beam in accordance with a change in temperature;

first imaging means for imaging the laser beam emitted from the laser source unit on a reflective facet of the deflector in a linear form extending in a plane of deflection to be made by the deflector;

second imaging means for imaging the laser beam deflected by the deflector on the scanning surface; and a resin lens which is provided in the first and/or the second imaging means, the refracting power of the resin lens changing according to a change in temperature so as to offset the change in the converging performance of the laser unit, wherein the resin lens meets a condition indicated by an expression $|f_1/f_f|>1.8$ in which, $f_1$ denotes a focal length of the resin lens in respect to a direction parallel to the plane of deflection; and $f_f$ denotes a focal length of the second imaging means in respect to a direction parallel to the plane of deflection.

2. A laser beam optical scanning system as claimed in claim 1, wherein the laser source unit includes:

The laser source for radiating a laser beam;

a holder for holding the laser source; and a collimator lens for changing the laser beam radiated from the laser source into a substantially parallel pencil of rays.

3. A laser beam optical scanning system as claimed in claim 1, wherein the resin lens has a small refractive power in a direction parallel with the plane of deflection and a large refractive power in a direction perpendicular to the plane of deflection.

4. A laser beam optical scanning system as claimed in claim 1, wherein the first imaging means includes a resin cylindrical lens for converging the laser beam rays to a focal point in a sub-scanning direction.

5. A laser beam optical scanning system as claimed in claim 1, wherein:

the second imaging means has an fθ lens system which comprises a lens with a toric surface and a cylindrical lens disposed immediately before the scanning surface; and the lens with a toric surface and the cylindrical lens are made of resin.

6. A laser beam optical scanning system as claimed in claim 1, wherein:

the second imaging means has an fθ lens system which comprises a lens with a toric surface and a cylindrical lens disposed immediately before the scanning surface; and the cylindrical lens is made of resin.

7. A laser beam optical scanning system as claimed in claim 1, wherein:

the second imaging means comprises an fθ lens system and a lens with a toric surface which lens is disposed before the fθ lens system; and the lens with a toric surface is made of resin.

8. A laser beam optical scanning system as claimed in claim 1, wherein:

the second imaging means comprises an fθ lens system and a cylindrical lens disposed immediately before the scanning surface; and the cylindrical lens is made of resin.

9. A laser beam optical scanning system as claimed in claim 1, wherein:

the second imaging means has an fθ lens system which has a lens with a toric surface; and the lens with a toric surface is made of resin.

10. A laser beam optical scanning system as claimed in claim 1, wherein:

the second imaging means comprises an fθ lens system which has a lens with a toric surface, and a cylindrical lens which is disposed immediately before the scanning surface; and the lens with a toric surface is made of resin.

11. A laser beam optical scanning system as claimed in claim 1, wherein:

the second imaging means comprises an fθ lens system which has a lens with a toric surface, and a cylindrical lens which is disposed immediately before the scanning surface; and the lens with a toric surface is made of resin.

12. A laser beam optical scanning system which deflects a laser beam modulated in accordance with image data by using a deflector to scan the laser beam on a scanning surface, the laser beam optical scanning system comprising:

a laser source for radiating a laser beam;

a holder for holding the laser source, the holder stretching or shrinking with change in temperature, thereby changing location of the laser source;

a convergent member for changing the laser beam radiated from the laser source into a substantially parallel pencil of rays;

first imaging means for imaging the laser beam emergent from the convergent member on a reflective facet of the deflector in a linear form extending in a plane of deflection to be made by the deflector;

second imaging means for imaging the laser beam deflected by the deflector on the scanning surface; and a resin lens provided in the first and/or the second imaging means, the refractive power of the resin lens changing according to a change in temperature, wherein the resin lens meets a condition indicated by an expression $$|f_1/f_f| > 1.8$$

in which, $f_1$ denotes a focal length of the resin lens in respect to a direction parallel to the plane of deflection; and $f_f$ denotes a focal length of the second imaging means in respect to a direction parallel to the plane of deflection.

13. A laser beam optical scanning system as claimed in claim 12, wherein the resin lens has a small power in a direction parallel with the plane of deflection and a big power in a direction perpendicular to the plane of deflection.

14. A laser beam optical scanning system with deflects a laser beam modulated in accordance with image data by using a deflector to scan the laser beam on a scanning surface, the laser beam optical scanning system comprising:

a laser source for radiating a laser beam;

a holder for holding the laser source, the holder stretching or shrinking with a change in temperature, thereby changing location of the laser source;

a convergent member for changing the laser beam radiated from the laser source into a substantially parallel pencil of rays;

first imaging means for imaging the laser beam emergent from the convergent member on a reflective facet of the deflector in a linear form extending in a plane of deflection to be made by the deflector;

second imaging means for imaging the laser beam deflected by the deflector on the scanning surface; and a resin lens provided in the first and/or the second imaging means, the refractive power of the resin lens changing according to a change in temperature;

wherein a change in the location of the laser source is offset by a change in the power of the resin lens so that the imaging of the laser beam on the scanning surface is substantially constant despite temperature changes; and wherein the resin lens meets a condition indicated by an expression $$|f_1/f_f| > 1.8$$

in which, $f_1$ denotes a focal length of the resin lens in respect to a direction parallel to the plane of deflection; and $f_f$ denotes a focal length of the second imaging means in respect to a direction parallel to the plane of deflection.

15. A laser beam optical scanning system as claimed in claim 14, wherein the resin lens has a small power in a direction parallel with the plane of deflection and a big power in a direction perpendicular to the plane of deflection.

16. A laser beam optical scanning system as claimed in claim 14, wherein the first imaging means includes a resin cylindrical lens for converging the laser beam range to a focal point in a subscanning direction.

17. A laser beam optical scanning system as claimed in claim 14, wherein:

the second imaging means has an fθ lens system which comprises a lens with a toric surface and a cylindrical lens disposed immediately before the scanning surface; and the lens with a toric surface and the cylindrical lens are made of resin.

18. A laser beam optical scanning system as claimed in claim 14, wherein:

the second imaging means has an fθ lens system which comprises a lens with a toric surface and a cylindrical lens disposed immediately before the scanning surface; and the cylindrical lens is made of resin.

19. A laser beam optical scanning system as claimed in claim 14, wherein:

the second imaging means comprises an fθ lens system and a lens with a toric surface which lens is disposed before the fθ lens system; and the lens with a toric surface is made of resin.

20. A laser beam optical scanning system as claimed in claim 14, wherein:

the second imaging means comprises an fθ lens system and a cylindrical lens disposed immediately before the scanning surface; and the cylindrical lens is made of resin.

21. A laser beam optical scanning system as claimed in claim 14, wherein:

the second imaging means has an fθ lens system which has a lens with a toric surface; and the lens with a toric surface is made of resin.

22. A laser beam optical scanning system for scanning a laser beam across a scanning surface comprising: a laser source for radiating a laser beam;

a collimator lens having a focal length $f_{CL}$ for forming the laser beam in substantially a parallel pencil of rays;

a metal holder for positioning the laser source a predetermined distance from the collimator lens;

a deflector member;

a plastic cylindrical lens having a focal length $f_{CL}$ focusing the parallel pencil of rays on the deflector member, the ratio of $f_{CY}/f_{CL}$ being approximately 15; and an imaging means for receiving the pencil of rays reflected off the deflector member and imaging them on the scanning surface including a plastic lens with a toric surface, any temperature change imposed on the metal holder, plastic cylindrical lens and plastic lens with a toric surface being compensated so that an infocus imaging of the pencil of rays on the scanning surface can be maintained, wherein the toric plastic lens meets a condition indicated by an expression $$|f_1/f_f|>1.8$$

in which, $f_1$ denotes a focal length of the toric plastic lens in respect to a direction parallel to the plane of deflection; and $f_f$ denotes a focal length of the imaging means in respect to a direction parallel to the plane of deflection.

23. A laser beam optical scanning system which deflects a laser beam modulated in accordance with image data by using a deflector to scan the laser beam on a scanning surface, the laser beam optical scanning system comprising:

a laser source unit which converges a laser beam to emit a substantially parallel pencil of rays, said laser source unit changing its converging performance according to temperature;

first imaging means which includes a cylindrical resin lens for converging the laser beam rays to a focal point in a sub-scanning direction, and which images the laser beam emitted from the laser source unit on a reflective facet of the deflector in a linear form extending in a plane of deflection to be made by the deflector; and second imaging means which images the laser beam deflected by the deflector on the scanning surface;

wherein the refractive power of the resin lens changes according to a change in temperature so as to offset a change in the converging performance of the laser source unit and the resin lens meets a condition indicated by $$|f_1/f_f|>1.8$$

in which $f_1$ denotes a focal length of the resin lens in respect to a direction parallel to the plane of deflection, and $f_f$ denotes a focal length of the second imaging means in respect to a direction parallel to the plane of deflection.

24. A laser beam optical scanning system as claimed in claim 23, wherein the laser source unit comprises:

a laser source for radiating a laser beam;

a holder for holding the laser source; and a collimator lens for changing the laser beam radiated from the laser source into a substantially parallel pencil of rays.

25. A laser beam optical scanning system as claimed in claim 23, wherein the resin lens has a small power in a direction parallel with the plane of deflection and a big power in a direction perpendicular to the plane of deflection.

\* \* \* \* \*